(12) United States Patent
Mei

(10) Patent No.: US 10,902,866 B2
(45) Date of Patent: Jan. 26, 2021

(54) SOUND SIGNAL PROCESSING METHOD, TERMINAL, AND HEADSET

(71) Applicant: HUAWEI TECHNOLOGIES CO., LTD., Guangdong (CN)

(72) Inventor: Jingqing Mei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

(21) Appl. No.: 16/331,617

(22) PCT Filed: Sep. 8, 2016

(86) PCT No.: PCT/CN2016/098455
§ 371 (c)(1),
(2) Date: Mar. 8, 2019

(87) PCT Pub. No.: WO2018/045536
PCT Pub. Date: Mar. 15, 2018

(65) Prior Publication Data
US 2019/0362738 A1    Nov. 28, 2019

(51) Int. Cl.
*G10L 25/51* (2013.01)
*H04W 4/029* (2018.01)
(Continued)

(52) U.S. Cl.
CPC .............. *G10L 25/51* (2013.01); *G06F 3/165* (2013.01); *G10L 21/0232* (2013.01); *H04B 1/385* (2013.01); *H04M 3/563* (2013.01); *H04M 3/568* (2013.01); *H04R 1/1041* (2013.01); *H04R 1/1083* (2013.01); *H04R 29/001* (2013.01);
(Continued)

(58) Field of Classification Search
None
See application file for complete search history.

(56) References Cited

U.S. PATENT DOCUMENTS

2012/0114130 A1    5/2012  Lovitt
2014/0010378 A1    1/2014  Voix et al.
(Continued)

FOREIGN PATENT DOCUMENTS

CN         1897054 A    1/2007
CN       101203059 A    6/2008
(Continued)

OTHER PUBLICATIONS

PCT International Search Report and Written Opinion in International Application No. PCT/CN2016/098,455, dated Jun. 7, 2017, 17 pages (With English translation).

*Primary Examiner* — Paul W Huber
(74) *Attorney, Agent, or Firm* — Fish & Richardson P.C.

(57) ABSTRACT

The present invention discloses a sound signal processing method, a terminal, and a headset, to prevent a sound in an external environment from causing unnecessary disturbance to a user, thereby improving user experience. The terminal includes: a microphone, configured to collect an ambient sound signal; and a processor, configured to: obtain the sound signal collected by the microphone, and process, based on user status information, the ambient sound signal collected by the microphone, where the user status information includes a geographical location of a user who uses the terminal or a motion status of the user.

13 Claims, 5 Drawing Sheets

(51) Int. Cl.
*G06F 3/16* (2006.01)
*G10L 21/0232* (2013.01)
*H04B 1/3827* (2015.01)
*H04M 3/56* (2006.01)
*H04R 1/10* (2006.01)
*H04R 29/00* (2006.01)

(52) U.S. Cl.
CPC ..... *H04W 4/029* (2018.02); *H04B 2001/3866* (2013.01); *H04M 2203/251* (2013.01)

(56) References Cited

U.S. PATENT DOCUMENTS

| | | | |
|---|---|---|---|
| 2014/0044269 | A1 | 2/2014 | Anderson |
| 2014/0185828 | A1* | 7/2014 | Helbling ................ H03G 5/165 381/103 |
| 2015/0201275 | A1 | 7/2015 | Lee |
| 2015/0222977 | A1* | 8/2015 | Angel, Jr. ............. H04R 1/105 381/74 |
| 2016/0014497 | A1* | 1/2016 | Chizi ................... H04R 1/1091 381/74 |
| 2017/0142511 | A1* | 5/2017 | Dennis ..................... H04R 5/04 |
| 2017/0188168 | A1* | 6/2017 | Lyren ..................... H04S 1/007 |

FOREIGN PATENT DOCUMENTS

| | | |
|---|---|---|
| CN | 101238711 A | 8/2008 |
| CN | 101840700 B | 5/2012 |
| CN | 202310041 U | 7/2012 |
| CN | 202353638 U | 7/2012 |
| CN | 103339960 A | 10/2013 |
| CN | 103581803 A | 2/2014 |
| CN | 103825993 A | 5/2014 |
| CN | 102520391 B | 12/2014 |
| CN | 104301827 A | 1/2015 |
| CN | 204145709 U | 2/2015 |
| CN | 104780404 A | 7/2015 |
| CN | 105205955 A | 12/2015 |
| CN | 105759948 A | 7/2016 |
| CN | 105895092 A | 8/2016 |
| EP | 2806618 A1 | 11/2014 |
| WO | 2007007916 A1 | 1/2007 |

* cited by examiner

SOUND SIGNAL PROCESSING METHOD, TERMINAL, AND HEADSET

CROSS-REFERENCE TO RELATED APPLICATIONS

This application is a National Stage of International Application No. PCT/CN2016/098455, filed on Sep. 8, 2016, which is hereby incorporated by reference in its entirety.

TECHNICAL FIELD

The present invention relates to the field of information technologies, and more specifically, to a sound signal processing method, a terminal, and a headset.

BACKGROUND

Currently, a headset is a device widely used for playing a sound signal. However, using the headset decreases a user's perception of a sound from an external environment. This may cause a risk of losing a signal or sound that is necessary for the user.

Currently, in a known technology, a terminal collects a sound signal from an external environment while running a current service (for example, a call, audio file playing, or a game), analyzes a sound feature of the collected sound signal, and when determining that the sound feature of the collected sound signal (recorded as a target sound signal for ease of differentiation and description) matches a preset sound feature, outputs the target sound signal in a form of an audio notification by using a headset.

However, this method fails to obtain excellent user experience. For example, if a user suddenly receives a washing machine prompt sound from an external environment when making a call, call quality of the user is severely affected; or if a user suddenly receives an automobile honk from a television at home when enjoying music with a headset at home, disturbance is caused to the user and user experience is severely affected, because there is completely no need to worry about safety protection against an automobile at the current location of the user.

Therefore, a technology needs to be provided to prevent a sound in an external environment from causing unnecessary disturbance to a user.

SUMMARY

This application provides a sound signal processing method, a terminal, and a headset, to process a received ambient sound signal based on current user status information, thereby preventing the ambient sound signal from causing unnecessary disturbance to a user.

According to a first aspect, a terminal is provided, including:

a microphone, configured to collect an ambient sound signal; and a processor, configured to: obtain the ambient sound signal collected by the microphone, and process the ambient sound signal based on user status information, where the user status information includes a geographical location of a user who uses the terminal and a motion mode of the user.

Optionally, the user status information may be determined by using the following information: a collection time of the ambient sound signal, a user schedule, or a behavior habit of the user.

A processing policy is determined for the received ambient sound signal based on the current user status information. An ambient sound signal for which the user needs to be prompted is processed to generate a prompt signal to prompt the user, and noise reduction processing is performed on an ambient sound signal for which the user does not need to be prompted. In this way, unnecessary disturbance is prevented from the user, and user experience is accordingly improved.

With reference to the first aspect, in a first possible implementation of the first aspect, when processing the ambient sound signal based on the user status information, the processor is configured to determine, based on the user status information, a set of valid sound signals that are used to prompt the user; and the processor is configured to generate a prompt signal based on the ambient sound signal when determining that the ambient sound signal belongs to the set of valid sound signals; or the processor is configured to perform noise reduction processing on the ambient sound signal when determining that the ambient sound signal does not belong to the set of valid sound signals.

With reference to the first aspect, in a second possible implementation of the first aspect, when processing the ambient sound signal based on the user status information, the processor is configured to determine, based on the ambient sound signal, a set of target user status information that is met before the ambient sound signal is processed to generate a prompt signal; and the processor is configured to generate the prompt signal based on the ambient sound signal when determining that the user status information set belongs to the set of target user status information; or the processor is configured to perform noise reduction processing on the ambient sound signal when determining that the user status information does not belong to the set of target user status information.

The set of valid sound signals is determined based on the current user status information, or the set of target user status information of the ambient sound signal is determined based on the received ambient sound signal, and then a corresponding processing policy is determined. An ambient sound signal for which the user needs to be prompted is processed to generate a prompt signal to prompt the user, and noise reduction processing is performed on an ambient sound signal for which the user does not need to be prompted. In this way, unnecessary disturbance is prevented from the user, and user experience is accordingly improved.

In an embodiment, the processor is further configured to process a plurality of sound signals based on the user status information, and when processing the plurality of sound signals based on the user status information, the processor is configured to determine, based on the user status information and a prestored mapping relationship between a plurality of valid sound signal subsets and a plurality of scenarios, whether the user status information belongs to at least one of the plurality of scenarios; and the processor is configured to generate a prompt signal based on the ambient sound signal when determining that the current user status information belongs to at least one of the plurality of scenarios and the ambient sound signal belongs to a valid sound signal subset that corresponds to a scenario to which the user status information belongs; or the processor is configured to determine to perform noise reduction processing on the ambient sound signal when determining that the user status information does not belong to any one of the plurality of scenarios; or the processor is configured to perform noise reduction processing on the ambient sound signal when determining that the user status information belongs to at least one of the plurality of scenarios but the ambient sound signal does not belong to a valid sound signal subset that corresponds to a scenario to which the user status information belongs.

The plurality of scenarios include a home scenario, an office scenario, an outdoor travel-by-vehicle scenario, and an outdoor sports scenario.

The processor may determine, based on the current user status information, a scenario to which the current user status information belongs, determine a set of valid sound signals that corresponds to the scenario, and determine a corresponding processing policy based on the received ambient sound signal.

With reference to the first aspect and the foregoing possible implementations, in a third possible implementation of the first aspect, when generating the prompt signal based on the ambient sound signal, the processor is configured to determine an output manner of the prompt signal based on priority information of a service currently running on the terminal and/or priority information of the ambient sound signal; and the processor is configured to generate the prompt signal based on the output manner of the prompt signal and the ambient sound signal.

Different output manners (or prompt manners) can be determined for different ambient sound signals based on priority information of a service and/or priority information of the ambient sound signals. In this way, disturbance to the user is reduced to a greater extent, and user experience is improved.

Optionally, the output manner includes a sound output manner, and the prompt signal includes a sound prompt signal;

when generating the prompt signal based on the output manner of the prompt signal and the ambient sound signal, the processor is specifically configured to generate the sound prompt signal based on the ambient sound signal when determining that the output manner of the prompt signal is the sound output manner; and the terminal further includes a communications module, configured to send the sound prompt signal to a headset, so that the sound prompt signal generated by the processor is played by using the headset.

In an embodiment, the sound output manner includes a first output manner, the first output manner is interrupting a current operating mode of the headset and playing the sound prompt signal, and the current operating mode of the headset corresponds to the service currently running on the terminal; and when determining the output manner of the prompt signal based on the service information of the service currently running on the terminal, the processor is specifically configured to:

when determining that the ambient sound signal has a highest priority, or when determining that the service currently running on the terminal has a lowest priority, or when determining that a priority of the ambient sound signal is higher than or equal to a priority of the service, determine that the output manner of the prompt signal is the first output manner.

The first output manner is determined for an ambient sound signal with a highest priority or an ambient sound signal with a priority higher than that of the service. In other words, the user is prompted in a manner that draws attention of the user most easily, so that the user can make a response based on the prompt signal. In this way, an unnecessary loss or unnecessary danger that may occur is prevented from the user.

Optionally, the output manner includes a text output manner, and the prompt signal includes a text prompt message;

when generating the prompt signal based on the output manner of the prompt signal and the ambient sound signal, the processor is specifically configured to generate the text prompt message based on the ambient sound signal when determining that the output manner of the prompt signal is the text output manner; and the terminal further includes a display screen, configured to present the text prompt message.

A different prompt manner is determined based on priority information of a service and/or priority information of an ambient sound signal, so that an important prompt is presented by using a sound signal, and an unimportant prompt is presented by using a text message. In this way, unnecessary disturbance to the user is reduced to a greatest extent without omitting any important prompt signal. This is very flexible and greatly improves user experience.

According to a second aspect, a headset is provided, including:

a microphone, configured to collect an ambient sound signal; and a processor, configured to: obtain the ambient sound signal collected by the microphone, and process the ambient sound signal based on user status information, where the user status information includes a geographical location of a user who uses the terminal or a motion status of the user.

Optionally, the user status information may be determined by using the following information: a collection time of the ambient sound signal, a user schedule, or a behavior habit of the user.

A processing policy is determined for the received ambient sound signal based on the current user status information. An ambient sound signal for which the user needs to be prompted is processed to generate a prompt signal to prompt the user, and noise reduction processing is performed on an ambient sound signal for which the user does not need to be prompted. In this way, unnecessary disturbance is prevented from the user, and user experience is accordingly improved.

With reference to the second aspect, in a first possible implementation of the second aspect, when processing the ambient sound signal based on the user status information, the processor is configured to determine, based on the user status information, a set of valid sound signals that are used to prompt the user; and the processor is configured to generate a prompt signal based on the ambient sound signal when determining that the ambient sound signal belongs to the set of valid sound signals; or the processor is configured to perform noise reduction processing on the ambient sound signal when determining that the ambient sound signal does not belong to the set of valid sound signals.

With reference to the second aspect, in a second possible implementation of the second aspect, when processing the ambient sound signal based on the user status information, the processor is configured to determine, based on the ambient sound signal, a set of target user status information that is met before the ambient sound signal is processed to generate a prompt signal; and the processor is configured to generate the prompt signal based on the ambient sound signal when determining that the user status information belongs to the set of target user status information; or the processor is configured to perform noise reduction processing on the ambient sound signal when determining that the user status information does not belong to the set of target user status information.

The set of valid sound signals is determined based on the current user status information, or the set of target user status information of the ambient sound signal is determined based on the received ambient sound signal, and then a corresponding processing policy is determined. An ambient sound signal for which the user needs to be prompted is processed to generate a prompt signal to prompt the user, and noise reduction processing is performed on an ambient sound signal for which the user does not need to be prompted. In this way, unnecessary disturbance is prevented from the user, and user experience is accordingly improved.

In an embodiment, the processor is further configured to process a plurality of sound signals based on the user status information, and when processing the plurality of sound signals based on the user status information, the processor is configured to determine, based on the user status information and a prestored mapping relationship between a plurality of valid sound signal subsets and a plurality of scenarios, whether the user status information belongs to at least one of the plurality of scenarios; and the processor is configured to generate a prompt signal based on the ambient sound signal when determining that the current user status information belongs to at least one of the plurality of scenarios and the ambient sound signal belongs to a valid sound signal subset that corresponds to a scenario to which the user status information belongs; or the processor is configured to determine to perform noise reduction processing on the ambient sound signal when determining that the user status information does not belong to any one of the plurality of scenarios; or the processor is configured to perform noise reduction processing on the ambient sound signal when determining that the user status information belongs to at least one of the plurality of scenarios but the ambient sound signal does not belong to a valid sound signal subset that corresponds to a scenario to which the user status information belongs.

The plurality of scenarios include a home scenario, an office scenario, an outdoor travel-by-vehicle scenario, and an outdoor sports scenario.

The processor may determine, based on the current user status information, a scenario to which the current user status information belongs, determine a set of valid sound signals that corresponds to the scenario, and determine a corresponding processing policy based on the received ambient sound signal.

With reference to the second aspect and the foregoing possible implementations, in a third possible implementation of the second aspect, when generating the prompt signal based on the ambient sound signal, the processor is configured to determine an output manner of the prompt signal based on priority information of a service currently running on the terminal and/or priority information of the ambient sound signal; and the processor is configured to generate the prompt signal based on the output manner of the prompt signal and the ambient sound signal.

Different output manners (or prompt manners) can be determined for different ambient sound signals based on priority information of a service and/or priority information of the ambient sound signals. In this way, disturbance to the user is reduced to a greater extent, and user experience is improved.

Optionally, the output manner includes a sound output manner, and the prompt signal includes a sound prompt signal;

when generating the prompt signal based on the output manner of the prompt signal and the ambient sound signal, the processor is specifically configured to generate the sound prompt signal based on the ambient sound signal when determining that the output manner of the prompt signal is the sound output manner; and the headset further includes: a speaker, configured to play the sound prompt signal generated by the processor.

In an embodiment, the sound output manner includes a first output manner, the first output manner is interrupting a current operating mode of the headset and playing the sound prompt signal, and the current operating mode of the headset corresponds to the service currently running on the terminal; and when determining the output manner of the prompt signal based on the service information of the service currently running on the terminal, the processor is specifically configured to:

when determining that the ambient sound signal has a highest priority, or when determining that the service currently running on the terminal has a lowest priority, or when determining that a priority of the ambient sound signal is higher than or equal to a priority of the service, determine that the output manner of the prompt signal is the first output manner.

The first output manner is determined for an ambient sound signal with a highest priority or an ambient sound signal with a priority higher than that of the service. In other words, the user is prompted in a manner that draws attention of the user most easily, so that the user can make a response based on the prompt signal. In this way, an unnecessary loss or unnecessary danger that may occur is prevented from the user.

Optionally, the output manner includes a text output manner, and the prompt signal includes a text prompt message;

when generating the prompt signal based on the output manner of the prompt signal and the ambient sound signal, the processor is specifically configured to generate the text prompt message based on the ambient sound signal when determining that the output manner of the prompt signal is the text output manner; and the headset further includes a communications module, configured to send the text prompt message to the terminal connected to the headset, so that the text prompt message is presented by using a display screen configured on the terminal.

A different prompt manner is determined based on priority information of a service and/or priority information of an ambient sound signal, so that an important prompt is presented by using a sound signal, and an unimportant prompt is presented by using a text message. In this way, unnecessary disturbance to the user is reduced to a greatest extent without omitting any important prompt signal. This is very flexible and greatly improves user experience.

According to a third aspect, a sound signal processing method is provided. The method may be performed by a sound signal processing apparatus, the sound signal processing apparatus may be the terminal in the first aspect or the headset in the second aspect, and the method includes:

obtaining an ambient sound signal; and processing the ambient sound signal based on user status information, where the user status information includes a geographical location of a user who uses the terminal or a motion status of the user.

Optionally, the user status information may be determined by using the following information: a collection time of the ambient sound signal, a user schedule, or a behavior habit of the user.

A processing policy is determined for the received ambient sound signal based on the current user status information. An ambient sound signal for which the user needs to be prompted is processed to generate a prompt signal to prompt the user, and noise reduction processing is performed on an ambient sound signal for which the user does not need to be prompted. In this way, unnecessary disturbance is prevented from the user, and user experience is accordingly improved.

With reference to the third aspect, in a first possible implementation of the third aspect, the processing the ambient sound signal based on user status information includes:

determining, based on the user status information, a set of valid sound signals that are used to prompt the user; and generating a prompt signal based on the ambient sound signal when determining that the ambient sound signal belongs to the set of valid sound signals; or performing noise reduction processing on the ambient sound signal when determining that the ambient sound signal does not belong to the set of valid sound signals.

With reference to the third aspect, in a second possible implementation of the third aspect, the processing the ambient sound signal based on user status information includes:

determining, based on the ambient sound signal, a set of target user status information that is met before the ambient sound signal is processed to generate a prompt signal; and generating the prompt signal based on the ambient sound signal when determining that the user status information belongs to the set of target user status information; or performing noise reduction processing on the ambient sound signal when determining that the user status information does not belong to the set of target user status information.

The set of valid sound signals is determined based on the current user status information, or the set of target user status information of the ambient sound signal is determined based on the received ambient sound signal, and then a corresponding processing policy is determined. An ambient sound signal for which the user needs to be prompted is processed to generate a prompt signal to prompt the user, and noise reduction processing is performed on an ambient sound signal for which the user does not need to be prompted. In this way, unnecessary disturbance is prevented from the user, and user experience is accordingly improved.

In an embodiment, the determining a processing policy based on the user status information and the ambient sound signal includes:

obtaining a mapping relationship between a plurality of valid sound signal subsets and a plurality of scenarios, where each valid sound signal subset includes at least one sound signal, each scenario includes at least one piece of user status information, and each scenario includes and is used to indicate user status information that is met when it is determined to process each sound signal in a corresponding valid sound signal subset to generate a prompt signal; and when determining, based on the user status information and the mapping relationship between the plurality of valid sound signal subsets and the plurality of scenarios, that the user status information belongs to at least one of the plurality of scenarios and the ambient sound signal belongs to a valid sound signal subset that corresponds to a scenario to which the user status information belongs, determining to process the ambient sound signal to generate a prompt signal; or determining to perform noise reduction processing on the ambient sound signal when determining that the user status information does not belong to any one of the plurality of scenarios; or performing noise reduction processing on the ambient sound signal when determining that the user status information belongs to at least one of the plurality of scenarios but the ambient sound signal does not belong to a valid sound signal subset that corresponds to a scenario to which the user status information belongs.

The plurality of scenarios include a home scenario, an office scenario, an outdoor travel-by-vehicle scenario, and an outdoor sports scenario.

The processor may determine, based on the current user status information, a scenario to which the current user status information belongs, determine a set of valid sound signals that corresponds to the scenario, and determine a corresponding processing policy based on the received ambient sound signal.

With reference to the third aspect and the foregoing possible implementations, in a third possible implementation of the third aspect, the generating the prompt signal based on the ambient sound signal includes:

determining an output manner of the prompt signal based on service priority information of a service currently running on the terminal and/or priority information of the ambient sound signal; and generating the prompt signal based on the output manner of the prompt signal and the ambient sound signal.

Different output manners (or prompt manners) can be determined for different ambient sound signals based on priority information of a service and/or priority information of the ambient sound signals. In this way, disturbance to the user is reduced to a greater extent, and user experience is improved.

Optionally, the output manner includes a sound output manner, and the prompt signal includes a sound prompt signal;

the generating the prompt signal based on the output manner of the prompt signal and the ambient sound signal includes:

generating the sound prompt signal based on the ambient sound signal when determining that the output manner of the prompt signal is the sound prompt manner; and the method further includes:

playing the sound prompt signal.

In an embodiment, the sound output manner includes a first output manner, the first output manner is interrupting a current operating mode of the headset and playing the sound prompt signal, and the current operating mode of the headset corresponds to the service currently running on the terminal; and the determining an output manner of the prompt signal based on service priority information of a service currently running on the terminal and/or priority information of the ambient sound signal includes:

when determining that the service currently running on the terminal has a lowest service priority, or when determining that the ambient sound signal has a highest priority, or when determining that a priority of the ambient sound signal is higher than or equal to a service priority of the service, determining that the output manner of the prompt signal is the first output manner.

The first output manner is determined for an ambient sound signal with a highest priority or an ambient sound signal with a priority higher than that of the service. In other words, the user is prompted in a manner that draws attention of the user most easily, so that the user can make a response based on the prompt signal. In this way, an unnecessary loss or unnecessary danger that may occur is prevented from the user.

Optionally, the output manner includes a text output manner, and the prompt signal includes a text prompt message;

the generating the prompt signal based on the output manner of the prompt signal and the ambient sound signal includes:

generating the text prompt message based on the ambient sound signal when determining that the output manner of the prompt signal is the text output manner; and the method further includes:

presenting the text prompt message.

A different prompt manner is determined based on priority information of a service and/or priority information of an ambient sound signal, so that an important prompt is presented by using a sound signal, and an unimportant prompt is presented by using a text message. In this way, unnecessary disturbance to the user is reduced to a greatest extent without omitting any important prompt signal. This is very flexible and greatly improves user experience.

According to a fourth aspect, a computer storage medium is provided. The computer storage medium stores program code, and the program code is used to instruct to perform an operation performed by the sound signal processing apparatus in any one of the third aspect or the optional implementations of the third aspect.

Therefore, according to the sound signal processing method, the terminal, and the headset in the embodiments of the present invention, the received ambient sound signal is processed based on the current user status information. In this way, unnecessary disturbance is prevented from the user, and user experience is accordingly improved.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A terminal in the embodiments of the present invention may be various devices that support sound signal output, for example, a device that may be used to play an audio or video file or answer a call. Correspondingly, the terminal may be a mobile phone, a wristband, a tablet computer, a notebook computer, an ultra-mobile personal computer (Ultra-Mobile Personal Computer, "UMPC" for short), a personal digital assistant (Personal Digital Assistant, "PDA" for short), a media player, a voice recorder, a wearable device, or the like, and is not limited to a communications terminal.

A headset in the embodiments of the present invention may be configured to play a sound signal output by a terminal device. The headset may include a receiver (or may be referred to as earbuds or earmuffs). The receiver includes a speaker that is configured to play a sound signal.

Figure 1A:
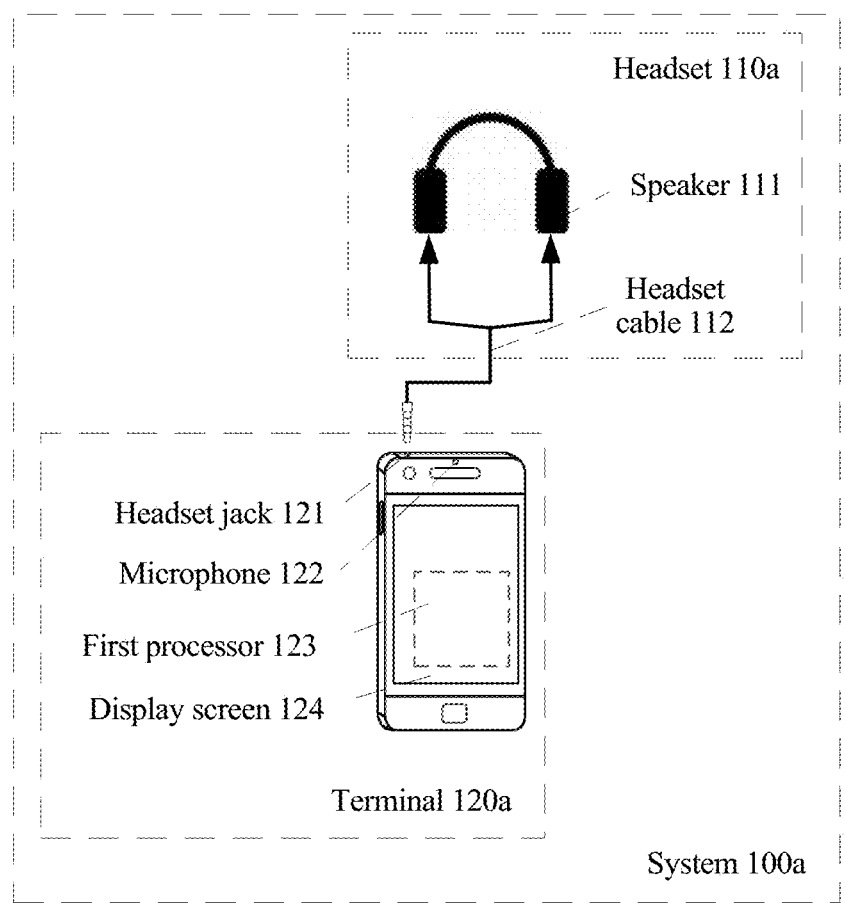
FIG. 1a and FIG. 1b are schematic diagrams of a system to which a signal processing method according to an embodiment of the present invention is applied.
Figure 1B:
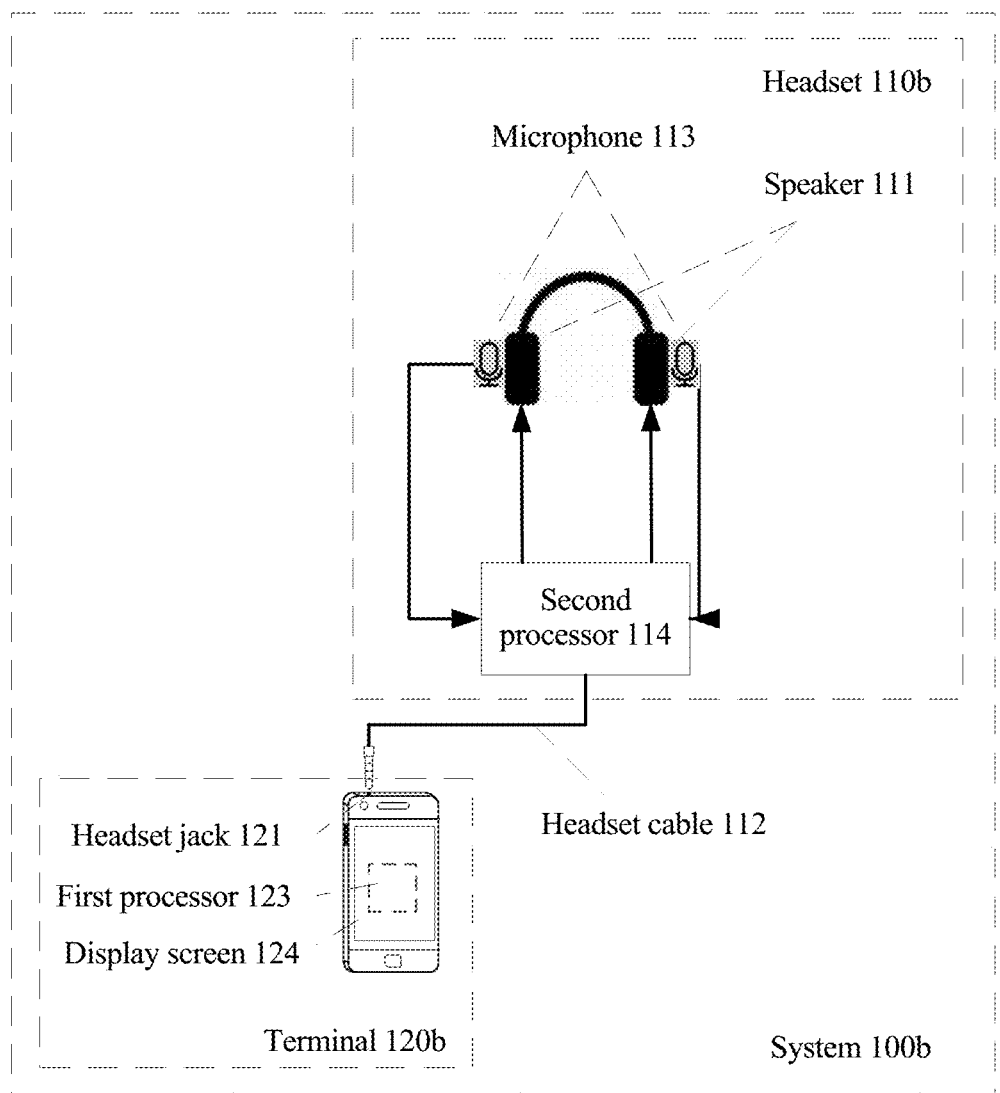

In the embodiments of the present invention, the headset and the terminal are connected to each other and may form a sound signal processing system. FIG. 1a and FIG. 1b are respectively schematic diagrams of a system 100a and a system 100b to which a signal processing method according to an embodiment of the present invention is applied.

It should be noted that a terminal may be specifically connected to a communications module (recorded as a second communications module for ease of differentiation) of a headset by using a communications module (recorded as a first communications module for ease of differentiation and description). Specifically, the headset and the terminal may be connected to each other in a wired connection manner or a wireless connection manner. When the headset and the terminal are connected to each other in the wired connection manner, the first communications module is a headset jack, and the second communications module is a headset cable. When the headset and the terminal are connected to each other in the wireless connection manner, the wireless connection manner may be, for example, Bluetooth (Bluetooth) or Wireless Fidelity (Wireless Fidelity, "WiFi" for short). For example, when the wireless connection manner is a Bluetooth connection, both the first communications module and the second communications module may be Bluetooth modules.

In this embodiment of the present invention, a description is provided by using an example in which the wired connection manner is specifically a connection through a headset cable, and a wireless connection manner is specifically a Bluetooth connection. However, it should be understood that this embodiment is shown merely for ease of description, and shall not be construed as any limitation on the present invention.

In a possible design, as shown in FIG. 1a, the system 100a includes a headset 110a and a terminal 120a.

Specifically, a headset jack 121 (or a Bluetooth module), a microphone 122, a processor (the processor configured in the terminal is recorded as a first processor for ease of differentiation and description) 123, and a display screen 124 may be configured in the terminal 120a. The first processor 123 is directly or indirectly connected to the microphone 122, the display screen 124, and the headset jack 121 (or the Bluetooth module) separately, to control signal receiving and sending of the microphone 122, the display screen 124, and the headset jack 121 (or the Bluetooth module). Correspondingly, a speaker 111 and a headset cable 112 (or a Bluetooth module) may be configured in the headset 110a.

The headset 110a may be connected to the headset jack 121 of the terminal 120a by using the headset cable 112 (specifically, by using a four-conductor pin of the headset cable). The terminal 120a may supply power to the headset 110a to drive the speaker (or a loudspeaker) 111 of the headset 110a. In other words, the terminal transmits a sound signal to the headset by using the headset cable.

Alternatively, the headset 110a may be connected to the terminal 120a by using a radio frequency technology (for example, Bluetooth (Bluetooth)). Specifically, the headset is a Bluetooth headset, and the terminal may be connected to the Bluetooth headset by using a Bluetooth module, to transmit a signal. It should be understood that although the Bluetooth module is not shown in FIG. 1a, this shall not be construed as any limitation on the present invention.

In the foregoing possible design, the terminal may collect an ambient sound signal by using the microphone, process the ambient sound signal by using the first processor to generate a prompt signal, and send a generated sound prompt signal to the headset by using the headset jack or the Bluetooth module, or present a generated text prompt message to a user by using the display screen (a case 1). The following describes the sound signal processing method in detail with reference to a specific function of each modular unit.

In another possible design, as shown in FIG. 1b, the system 100b includes a headset 110b and a terminal 120b.

A speaker (or a loudspeaker) 111, a headset cable 112 (or a Bluetooth module), a microphone 113, and a processor (the processor configured in the headset is recorded as a second processor for ease of differentiation and description) 114 may be configured in the headset 110b. The second processor 114 may be directly or indirectly connected to the speaker 111, the headset cable 112 (or the Bluetooth module), and the microphone 113 separately, to control signal receiving and sending of the speaker 111, the headset cable 112 (or the Bluetooth module), and the microphone 113.

Correspondingly, a headset jack 121 (or a Bluetooth module), a processor (namely, a first processor) 123, and a display screen 124 may be configured in the terminal 120b. The first processor may be directly or indirectly connected to the headset jack 121 (or the Bluetooth module) and the display screen 125 separately, to control signal receiving and sending of the headset jack 121 (or the Bluetooth module), and control the display screen 124 to present a text prompt message.

The headset 110b may be connected to the headset jack 121 of the terminal 120b by using the headset cable 112 (specifically, by using a four-conductor pin of the headset cable). The terminal 120b may supply power to the headset 110b to drive the speaker (or the loudspeaker) 111 and the microphone 113 of the headset. In other words, the terminal transmits a sound signal to the headset by using the headset cable.

Alternatively, the headset 110b may be connected to the terminal 120b by using a radio frequency technology (for example, Bluetooth (Bluetooth)). Specifically, the headset is a Bluetooth headset, and the terminal may be connected to the Bluetooth headset by using a Bluetooth module, to transmit a signal. It should be understood that although the Bluetooth module is not shown in FIG. 1b, this shall not be construed as any limitation on the present invention.

In the foregoing possible design, the headset may collect an ambient sound signal by using the microphone, process the ambient sound signal by using the processor to generate a prompt signal, and output a generated sound prompt signal to a user by using the speaker, or send a generated text prompt message to the terminal, and present the text prompt message to a user by using the display screen of the terminal (a case 2). The following describes the sound signal processing method in detail with reference to a specific function of each modular unit.

It should be understood that the headset, the terminal, and the connection relationship between the headset and the terminal that are shown in FIG. 1a and FIG. 1b are merely examples for description, and shall not be construed as any limitation on the present invention. For example, the headset or the terminal may include more modular units. For example, the headset in FIG. 1a may further include a microphone, and the terminal in FIG. 1b may further include more microphones or the like.

It should be noted that in the foregoing two possible designs, the ambient sound signal may be collected by using the microphone configured in the terminal, and the ambient sound signal may be processed by using the processor (namely, the first processor) configured in the terminal (in other words, this corresponds to the case 1); or the ambient sound signal may be collected by using the microphone of the headset, and the ambient sound signal may be processed by using the processor (namely, the second processor) of the headset (in other words, this corresponds to the case 2). In the following, for ease of description, unless otherwise specified, the microphone may be the microphone configured in the terminal in the case 1, and the processor may be the first processor configured in the terminal in the case 1; or the microphone may be the microphone configured in the headset in the case 2, and the processor may be the second processor configured in the headset in the case 2.

In other words, the microphone, the processor, and the headset (or the speaker) form a sound signal processing apparatus. The sound signal processing apparatus may be configured to perform steps and procedures in the method 200 described below. Optionally, the sound signal processing apparatus may further include a display screen. It should be understood that the sound signal processing apparatus may be an independent apparatus or may be integrated into the terminal or the headset, or modular units of the sound signal processing apparatus may be separately configured in the terminal and the headset, to perform a sound signal processing function. This is not particularly limited in the present invention.

Figure 2:
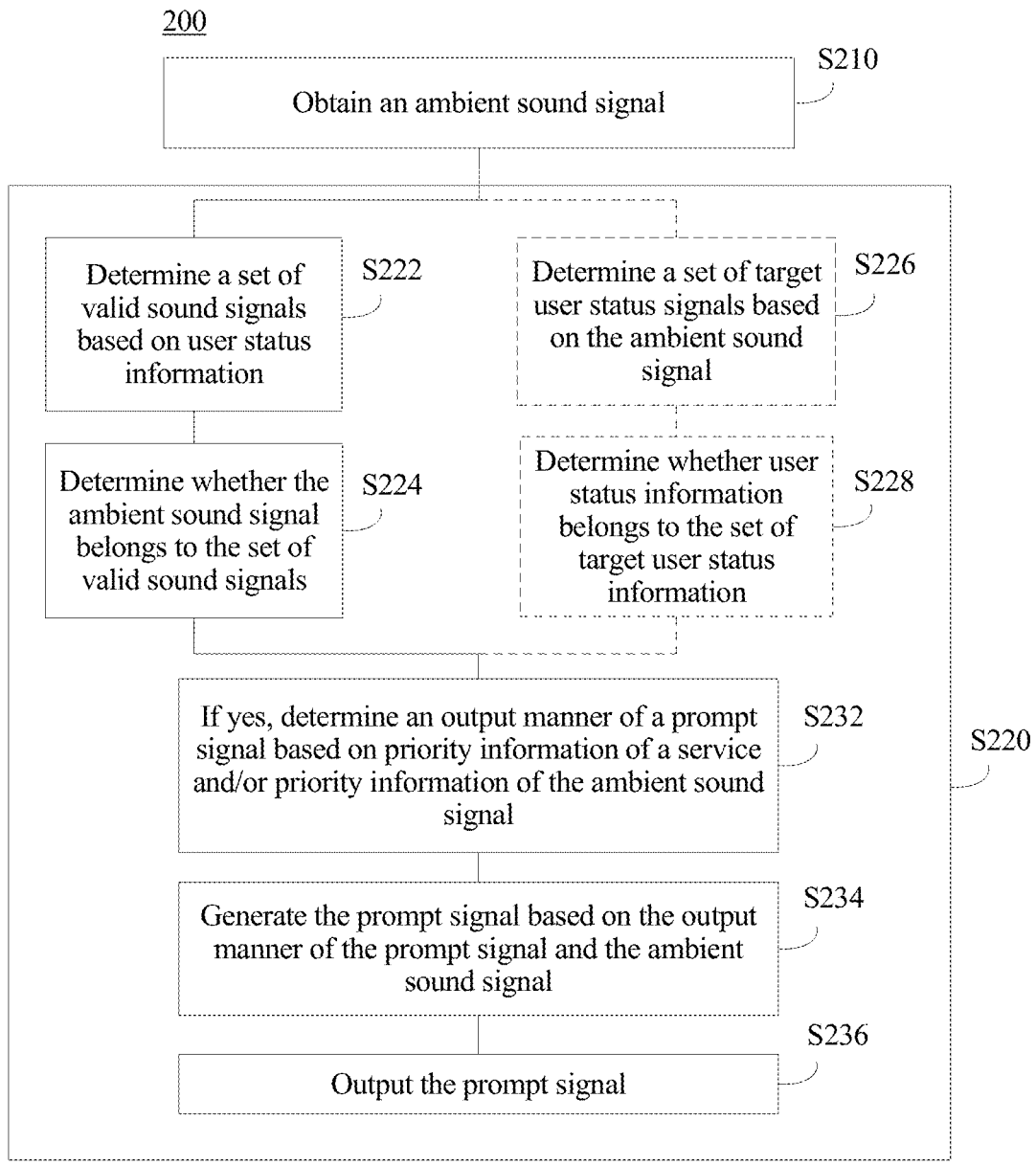
FIG. 2 is a schematic flowchart of a sound signal processing method according to an embodiment of the present invention.

The following describes, in detail with reference to FIG. 2, a detailed process of processing a sound signal by the sound signal processing apparatus according to an embodiment of the present invention.

FIG. 2 is a schematic flowchart of a sound signal processing method 200 according to an embodiment of the present invention. It should be understood that FIG. 2 shows detailed communication steps or operations of the sound signal processing method, but these steps or operations are merely examples. In this embodiment of the present invention, another operation or a variant of each operation in FIG. 2 may be further performed. In addition, the steps in FIG. 2 may be performed in a sequence different from the sequence presented in FIG. 2, and not all the operations in FIG. 2 need to be performed.

The following describes the sound signal processing method 200 according to this embodiment of the present invention in detail with reference to each modular unit of the sound signal processing apparatus.

As shown in FIG. 2, the method 200 includes the following steps.

S210. The microphone collects an ambient sound signal, and sends the ambient sound signal to the processor.

In other words, in S210, the processor obtains the ambient sound signal (the ambient sound signal obtained by the processor is recorded as an ambient sound signal A for ease of differentiation and description), so that the processor analyzes the ambient sound signal.

For example, the ambient sound signal in this embodiment of the present invention includes but is not limited to a speech sound of a specific person, a broadcast sound in a bus, a subway, or the like, a honk of a vehicle, an alarm sound, a prompt sound of an electric appliance (for example, a microwave oven or a washing machine), a ringtone of a mobile phone, a telephone ringtone, a doorbell sound, and a sound from a television.

S220. The processor processes the ambient sound signal based on user status information.

The processor may analyze a sound feature of the ambient sound signal A, to identify a sound source of the ambient sound signal A, and determine, based on the current user status information (the current user status information is recorded as user status information A for ease of differentiation and description), whether the collected ambient sound signal A is a valid sound signal relative to the user status information A.

As an example instead of a limitation, the user status information may include a geographical location of a user who uses the terminal or a motion status of the user.

The geographical location of a user includes a regional location and an indoor/outdoor location. For example, the user is located in Haixing Plaza, Danling Street, Haidian District, Beijing. The regional location may be determined by using the prior art (for example, a Global Positioning System (Global Positioning System, "GPS" for short)), and whether the user is located indoors or outdoors may be further determined by using boarder lines of buildings drawn in a region.

The motion status of the user includes motionless, walking, running, traveling by vehicle, and the like. The processor may determine the motion status by using a motion sensor. For example, if the motion sensor detects that the terminal is in a motionless state, the processor considers that the user is currently in a motionless state; or if the motion sensor detects that a motion of the terminal is a horizontal movement and a movement speed is relatively low and is close to a walking speed, the processor considers that the user is walking; or if the motion sensor detects that a motion of the terminal is a horizontal movement and a movement speed is close to a vehicle speed, the processor considers that the user is traveling by vehicle; or if the motion sensor detects that a motion of the terminal is a horizontal movement along with repeated up-and-down motions, the processor considers that the user is running.

Optionally, the user status information may be determined by using the following information: a collection time of the ambient sound signal, a user schedule, or a behavior habit of the user.

For example, the processor may infer the geographical location of the user based on the collection time of the ambient sound signal and the user schedule, or may collect statistics on the behavior habit of the user by using a machine learning method and then infer the geographical location of the user, or even may determine, by using a motion route of the positioned terminal, whether the user is on a bus or in a private car.

It should be understood that the foregoing illustrated methods for determining the user status information are merely examples for description, and shall not be construed as any limitation on the present invention. The present invention shall not be limited thereto either. For example, the processor may further determine, based on signal strength of a wireless network, whether the user is located indoors or outdoors. It should be understood that a specific method for determining the user status information by the processor may be implemented by using the prior art or a future technology. However, this is not the core of the present invention. Details are not described herein.

The processor may determine the current user status information by using the foregoing illustrated methods, and then determine a processing policy for the received ambient sound signal, to process the ambient sound signal. Specifically, the processing policy may be: generating a prompt signal based on the ambient sound signal, or performing noise reduction processing on the ambient sound signal.

Generating the prompt signal based on the ambient sound signal means extracting a valid signal (to be specific, a signal that needs to be output to prompt the user) from the received ambient sound signal, and performing noise reduction on other ambient noises; or performing synthesis processing on a valid signal in the received ambient sound signal to generate the prompt signal, and outputting the prompt signal to prompt the user.

Performing noise reduction processing on the ambient sound signal means using the received ambient sound signal A as a noise, and processing the ambient sound signal to prevent the ambient sound signal from being perceived by the user; or processing the ambient sound signal when the processor obtains the ambient sound signal, to prevent the ambient sound signal from being output by the processor, and playing the processed ambient sound signal by the headset (or the speaker). The following describes, in detail, the foregoing two manners of processing the ambient sound signal. Details are not described herein. For example, if the user receives an automobile honk coming through a window when the user is at home or in an office, the processor may determine to perform noise reduction processing on the automobile honk; or if a current time is two o'clock in the morning, and a prompt sound is received from a washing machine, the processor may determine to perform noise reduction processing on the prompt sound; or if a movement speed of the user is close to a running speed, the processor may determine that the user is doing sports, and when an automobile honk is received in this case, the processor may determine to process the automobile honk to generate a prompt signal; or if the processor determines, based on the user schedule, that the user is currently at a meeting, the processor may determine to perform noise reduction processing on a received doorbell sound; or if the processor determines, based on the behavior habit of the user, that the user is currently driving during commuting, the processor performs noise reduction processing on a bus stop announcement coming through a window, and processes an automobile honk to generate a prompt signal.

It should be noted that for the case 1 in which the processor (namely, the first processor) is configured in the terminal, when a geographical location is obtained from a positioning module by the processor, because the positioning module is configured in the terminal, the geographical location is a geographical location of the terminal. However, because the headset and the terminal may be connected to each other by using a headset cable or a radio frequency, and a valid distance between the headset and the terminal is not greater than 10 meters, the geographical location of the user may be determined by using the geographical location of the terminal. For the case 2 in which the processor (namely, the second processor) is configured in the headset, when a geographical location is obtained from a positioning module by using the processor, the geographical location is a geographical location of the headset, in other words, the geographical location of the user who is wearing the headset. Similarly, the terminal or the headset may also obtain the movement speed of the user by using the processor.

After obtaining the ambient sound signal A and determining the user status information A, the processor may determine the processing policy based on the user status information A and the ambient sound signal A.

Optionally, the processing, by the processor, the ambient sound signal based on user status information in S220 includes:

S222. The processor determines, based on the user status information, a set of valid sound signals that are used to prompt a user.

S224. The processor determines whether the ambient sound signal belongs to the set of valid sound signals.

The processor generates a prompt signal based on the ambient sound signal when determining that the ambient sound signal belongs to the set of valid sound signals; or the processor performs noise reduction processing on the ambient sound signal when determining that the ambient sound signal does not belong to the set of valid sound signals.

Herein, it should be noted that S222 and S224 shown above and S226 and S228 shown below are two possible implementations of determining the processing policy for the ambient sound signal. The processing policy may be determined by performing S222 and S224 or by performing S226 and S228. This is not particularly limited in the present invention. Therefore, sequence numbers of the foregoing processes do not mean execution sequences. The execution sequences of the processes should be determined based on functions and internal logic of the processes, and shall not be construed as any limitation on the implementation processes of this embodiment of the present invention.

It should be further noted that the step, shown above or below, of generating the prompt signal based on the ambient sound signal corresponds to a step that is subsequently performed when a determining result in S224 or S228 is yes, and the step, shown above or below, of performing noise reduction processing on the ambient sound signal may correspond to a step that is subsequently performed when a determining result in S224 or S228 is no. Therefore, steps performed may vary with determining results in S224 and S228, and the sequence numbers of the foregoing processes shall not be construed as any limitation on the execution sequences.

Herein, for ease of description and understanding, a set that is of ambient sound signals for which the user needs to be prompted and that is determined by the processor based on the user status information is recorded as the set of valid sound signals. The set of valid sound signals includes one or more valid sound signals. In other words, the processor may determine, based on the user status information A, whether the ambient sound signal A is a valid sound signal.

For example, the valid sound signal may be a sound signal that may cause impact on safety, privacy, life, work, and the like of the user or a person (for example, a relative or a friend) related to the user.

For example, if the user suddenly receives a fire alarm when enjoying music at home, the fire alarm may be considered as a valid sound signal, because personal safety is severely affected; or if the user receives a bus stop announcement when watching a video on a bus, the bus stop announcement may be considered as a valid sound signal, because whether the user misses a destination is affected; or if the user receives a doorbell sound when running and enjoying music in a yard of the user, the doorbell sound may be considered as a valid sound signal, because the doorbell may be rang by a user's relative or friend who is paying a visit or a theft who wants to check whether anybody is at home, and this may cause the user's relative or friend to wait for a long time outside a door, or may affect property security of the user; or if the user receives a ringtone of an office telephone when working in an office and wearing a headset with a noise reduction function enabled, the ringtone may be considered as a valid sound signal, because work of the user may be affected.

Further, the processor may determine, by analyzing sound feature information of the ambient sound signal A, whether the ambient sound signal A belongs to the set of valid sound signals, or identify whether the ambient sound signal A is a valid sound signal.

In a possible implementation, the terminal or the headset may pre-store the foregoing valid sound signal, and the processor may obtain the valid sound signal from the terminal or the headset, or the processor may obtain the set of valid sound signals from a server. The valid sound set stores sound feature information of all valid sound signals, for example, feature information such as a wavelength, a frequency, strength, and a rhythm of a sound wave. When receiving the ambient sound signal A sent from the microphone, the processor may analyze the sound feature information of the ambient sound signal A and match the sound feature information of the ambient sound signal A against sound feature information of each valid sound signal in the set of valid sound signals. When a matched sound signal with same sound feature information as the ambient sound signal A is found, the processor may consider the ambient sound signal A as a valid sound signal, and may generate a prompt signal based on the ambient sound signal A. If no matched sound signal with same sound feature information as the ambient sound signal A is found in the set of valid sound signals, the processor may consider that the ambient sound signal A is not a valid sound signal, and may determine to perform noise reduction processing on the ambient sound signal A. The following describes, in detail, a specific process of processing the ambient sound signal A.

Herein, it should be noted that the server may be considered as a cloud database used to provide data storage, and the terminal or the headset may be connected to the server by using a wireless network, to obtain needed data from the server. The server may store, maintain, and update the data. It should be understood that obtaining the data from the server is merely a possible implementation of obtaining, by the processor, the set of valid sound signals or a set of target user status information described below, and shall not be construed as any limitation on the present invention.

Optionally, the processor may pre-store a target sound signal set or obtain a target sound signal set from the server. The target sound signal set herein may be understood as a union set of sets that are of valid sound signals and that correspond to various user statuses. In other words, the target sound signal set includes several sets of valid sound signals.

When determining a set of valid sound signals that corresponds to the user status information A, the processor may obtain the set of valid sound signals from the target sound signal set, to perform matching for the ambient sound signal A.

Herein, it should be noted that the ambient sound signal may include a speech signal or a non-speech signal.

The speech signal may be a sound signal generated by a specific person or a speech signal in a public place. For example, the specific person may be a specified person (for example, a relative or a leader) or a broadcast sound in the public place (for example, a broadcast sound in a bus or a subway). Sound feature information of the speech signal may be voiceprint feature information.

The non-speech signal may be a sound signal other than the speech signal. The non-speech signal may include a prompt sound signal generated by an electronic device, an ambient noise, or the like, for example, a prompt sound of a washing machine or a microwave oven, or a telephone ringtone. Sound feature information of the non-speech signal includes a frequency, a wavelength and the like.

Optionally, the set of valid sound signals may be divided into several subsets.

For example, the valid sound set may be divided into a private sound subset, a public sound subset, and a non-speech prompt sound subset. Each subset stores a correspondence between a sound signal and sound feature information. In particular, for a speech signal, a correspondence between a sound signal and a voiceprint feature may be stored.

The private sound subset may be a set of speech signals, for example, a speech sound of a relative or a leader, for which the user needs to be prompted with an external sound based on a personal setting of the user. The public sound subset may have a voiceprint feature of a prompt speech of some public places, facilities, and devices, for example, a broadcast sound in a bus or a subway. The non-speech prompt sound subset may include a non-speech type sound for which the user needs to be prompted, for example, an automobile honk, a ringtone of a mobile phone, a prompt sound of a household appliance, or a doorbell sound.

After receiving the ambient sound signal A, the processor may separately perform matching in the foregoing subsets to find a same sound signal.

When performing matching for the ambient sound signal, the processor may perform matching in each subset based on a subset to which each valid sound signal belongs.

It should be understood that the foregoing three valid sound signal subsets are merely used as examples and are sets obtained through classification based on different feature information, and shall not be construed as any limitation on the present invention. Valid sound signals in the three valid sound signal subsets may be stored in a database through classification based on feature information or without classification, and likewise, this shall not be construed as any limitation on a matching process of the ambient sound signal.

In this way, the processor may determine the processing policy for the ambient sound signal A.

It should be understood that the method for analyzing, by the processor, sound feature information of the ambient sound signal and matching the sound feature information against preset sound feature information may be implemented by using the prior art. For brevity, a detailed description of the implementation in the prior art is omitted herein.

Optionally, the processing, by the processor, the ambient sound signal based on user status information in S220 includes:

S226. The processor determines, based on the ambient sound signal, a set of target user status information that is met before the ambient sound signal is processed to generate a prompt signal.

S228. The processor determines whether the user status information belongs to the set of target user status information.

The processor generates the prompt signal based on the ambient sound signal when determining whether the user status information belongs to the set of target user status information; or the processor performs noise reduction processing on the ambient sound signal when determining that the user status information does not belong to the set of target user status information. Herein, for ease of description and understanding, a set of user status information that is met before the processor processes the ambient sound signal to generate the prompt signal is recorded as the set of target user status information. In other words, a same ambient sound signal may correspond to a plurality types of user status information. The corresponding herein means that when the current user status information matches at least one of the user status information included in the target user status set, the ambient sound signal may be processed to generate the prompt signal.

To be specific, the ambient sound signal A corresponds to user status information 1 and user status information 2, and when the current user status information A matches the user status information 1 or the user status information 2, the ambient sound signal A may be processed to generate a prompt signal.

It can be learned from the foregoing descriptions that the user status information includes the geographical location or the motion status. Herein, the geographical location or the motion status may be understood as a matching item, and specific content corresponding to each item may be understood as to-be-matched content. Assuming that the current user status information A matches at least one (for example, the user status information 1) in the set of target user status information, the matching herein may include the following cases:

1. A matching item included in the user status information A and a matching item included in the user status information 1 have an intersection (for example, the geographical location). If geographical location information in the user status information A is completely the same as geographical location information in the user status information 1, or in other words, to-be-matched content is completely the same, it is considered that the user status information A matches the user status information 1. Usually, matching items included in the currently collected user status information A are more than or equal to matching items included in the pre-stored user status information 1.

2. A matching item (for example, the geographical location and the motion status) included in the user status information A is the same as a matching item included in the user status information 1. If geographical location information in the user status information A is completely the same as geographical location information in the user status information 1, and motion status information in the user status information A is completely the same as motion status information in the user status information 1, it is considered that to-be-matched content is the same, and the user status information A matches the user status information 1.

On the contrary, a matching item (for example, the geographical location and the motion status) included in the user status information A is the same as a matching item included in the user status information 1. If geographical location information in the user status information A is completely the same as geographical location information in the user status information 1, but motion status information in the user status information A is different from motion status information in the user status information 1, it is considered that to-be-matched content is different, and the user status information A does not match the user status information 1.

For example, the current user status information A collected by the terminal includes a geographical location (for example, outside an office) and a motion mode (for example, walking), and the user status information 1 corresponding to the ambient sound signal A includes a geographical location (for example, outside an office). An intersection between the matching items is the geographical location. If specific content in the user status information A and specific content in the user status information 1 are identical (to be specific, outside an office), it is considered that the to-be-matched content is completely identical, and the ambient sound signal A may be processed to generate a prompt signal.

For another example, the current user status information A collected by the terminal includes a geographical location (for example, outside an office) and a motion mode (for example, walking), and the user status information 1 corresponding to the ambient sound signal A includes a geographical location (for example, outside an office) and a motion mode (for example, traveling by vehicle). It is considered that matching item intersections between the user status information A and the user status information 1 are the geographical location and the motion mode. However, specific content of the to-be-matched content: the motion mode is not identical. In this case, it is considered that the user status information A does not match the user status information 1, and noise reduction processing may be performed on the ambient sound signal.

In this embodiment of the present invention, when receiving the ambient sound signal A, the processor may determine the corresponding set of target user status information based on the sound feature information of the ambient sound signal A. The processor matches the user status information A against user status information in the set of target user status information. If the user status information A matches at least one piece of user status information in the set of target user status information, the processor considers that the user status information A successfully matches the set of target user status information, and may determine to process the ambient sound signal to generate a prompt signal. If the user status information A does not match any one piece of user status information in the target user status set, the processor considers that the user status information A fails to match the set of target user status information, and may determine to perform noise reduction processing on the ambient sound signal. The following describes, in detail, a specific process of processing the ambient sound signal A.

In this way, the processor may determine the processing policy for the ambient sound signal A.

It should be understood that the method for analyzing, by the processor, sound feature information of the ambient sound signal and matching the sound feature information against preset sound feature information may be implemented by using the prior art. For brevity, a detailed description of the implementation in the prior art is omitted herein.

According to the foregoing two methods, it may be learned that the processor mainly considers the user status information A when determining the processing policy for the ambient sound signal A. It may be understood that a correspondence (recorded as a correspondence A for ease of differentiation and description) is formed between the ambient sound signal A and the user status information A, and when the correspondence A meets a correspondence between a valid sound signal and target user status information, the processor may process the ambient sound signal A to generate a prompt signal; or when the correspondence A does not meet the correspondence between a valid sound signal and target user status information, the processor performs noise reduction processing on the ambient sound signal A.

It should be noted that the correspondence between a valid sound signal and target user status information herein may be pre-stored in the terminal or the headset, or may be obtained from the server. The target user status information is used to indicate user status information that is met when a corresponding valid sound signal needs to be processed to generate a prompt signal. The following describes, in detail, a mapping relationship between a plurality of valid sound signals and a plurality of pieces of user status information with reference to Table 1.

Herein, it is assumed that the user status information A in the correspondence A includes three matching items: a1, a2, and a3, and it is assumed that the matching items correspond to same to-be-matched content.

TABLE 1

| Correspondence between an ambient sound signal and user status information | Ambient sound signal | User status information |
|---|---|---|
| Correspondence A | Ambient sound signal A | a1, a2, and a3 |
| Mapping relationship 1 | Ambient sound signal A | a1, a2, and a3 |
| Mapping relationship 2 | Ambient sound signal A | a4, a5, and a6 |
| Mapping relationship 3 | Ambient sound signal A | a1 and a2 |
| Mapping relationship 4 | Ambient sound signal B | a1, a2, and a3 |
| Mapping relationship 5 | Ambient sound signal B | a1, a2, and a5 |

Table 1 shows five pre-stored mapping relationships (namely, the mapping relationship 1 to the mapping relationship 5), which are separately a correspondence between the ambient sound signal A and user status information and a correspondence between the ambient sound signal B and user status information. It may be learned that a same ambient sound signal (for example, the ambient sound signal A) may correspond to a plurality of different pieces of user status information, and different ambient sound signals (for example, the ambient sound signal A and the ambient sound signal B) may also correspond to same user status information.

The processor may determine, based on the pre-stored plurality of mapping relationships, whether the correspondence A meets any one of the plurality of mapping relationships. It should be noted that herein that the correspondence A meets the mapping relationship between a valid sound signal and target user status information includes: the ambient sound signal A in the correspondence A is the same as a valid ambient sound signal, and there is an intersection between information included in the user status information A in the correspondence A and user status information included in the target user status information (in other words, the user status information A is completely or partially the same as the target user status information).

Table 1 is still used as an example. The processor may determine, from the plurality of mapping relationships shown in Table 1 based on the user status information A, user status information that is met by the user status information A. To be specific, for example, as shown in Table 1, the processor may determine, based on the user status information a1, a2, and a3, that user status information met by the user status information a1, a2, and a3 is separately stored in the mapping relationship 1 (a1, a2, and a3), the mapping relationship 3 (a1 and a2), the mapping relationship 4 (a1, a2, and a3), and the mapping relationship 5 (a1, a2, and a5). The processor further determines, from the mapping relationship 1, the mapping relationship 3, the mapping relationship 4, and the mapping relationship 5, whether there is an ambient sound signal that has same sound feature information as the ambient sound signal A. In other words, the processor determines whether the mapping relationship 1, the mapping relationship 3, the mapping relationship 4, and the mapping relationship 5 include the ambient sound signal A. When determining that the mapping relationship 1 and the mapping relationship 3 include the ambient sound signal A, the processor determines to process the ambient sound signal A to generate a prompt signal.

It may be understood that there may be no intersection between the user status information A and any one of the plurality of pieces of pre-stored user status information. In this case, the processor may directly determine to perform noise reduction processing on the ambient sound signal A, and does not need to further analyze the sound feature information of the ambient sound signal.

In an embodiment, the processing, by the processor, the ambient sound signal based on user status information in S220 includes:

obtaining, by the processor, a mapping relationship between a plurality of valid sound signal subsets and a plurality of scenarios, where each valid sound signal subset includes at least one sound signal, each scenario includes at least one piece of user status information, and each scenario includes and is used to indicate user status information that is met when it is determined to process each sound signal in a corresponding valid sound signal subset to generate a prompt signal; and generating, by the processor, a prompt signal based on the ambient sound signal when determining, based on the user status information and the mapping relationship between the plurality of valid sound signal subsets and the plurality of scenarios, that the user status information belongs to at least one of the plurality of scenarios and the ambient sound signal belongs to a valid sound signal subset that corresponds to a scenario to which the user status information belongs; or performing noise reduction processing on the ambient sound signal when determining that the user status information does not belong to any one of the plurality of scenarios; or performing noise reduction processing on the ambient sound signal when determining that the user status information belongs to at least one of the plurality of scenarios but the ambient sound signal does not belong to a valid sound signal subset that corresponds to a scenario to which the user status information belongs.

In other words, the terminal or the headset may pre-store the mapping relationship between the plurality of valid sound signal subsets and the plurality of scenarios, or the processor may obtain the mapping relationship between the plurality of valid sound signal subsets and the plurality of scenarios from the server in advance, determine, based on the current user status information, the scenario to which the current user status information belongs, and then further determine whether the ambient sound signal belongs to a target sound signal set corresponding to the scenario.

Specifically, a plurality of scenarios are obtained through division based on a plurality of pieces of possible user status information and based on the behavior habit of the user that is obtained through statistical collection. A different target sound signal set is used for each scenario. For example:

A first scenario may be a home scenario, and a corresponding target sound signal set may be a private voiceprint speech (for example, a speech sound of a family member) and a prompt sound in a home environment (for example, a fire alarm or a doorbell ringtone).

A second scenario may be an office scenario, and a corresponding target sound signal set may be a private voiceprint speech (for example, a speech sound of a colleague or a leader) and a prompt sound in an office environment (for example, a fire alarm or a telephone ringtone).

A third scenario may be an outdoor travel-by-vehicle scenario, and a corresponding target sound signal set may be a public voiceprint speech (for example, a broadcast sound in a bus or a subway).

A fourth scenario may be an outdoor sports scenario, and a corresponding target sound signal set may be a prompt sound in an outdoor environment (for example, an automobile honk).

In this way, the processor may determine, based on the current user status information, the scenario to which the current user status information belongs, and perform matching for the received ambient sound signal in the target sound signal set corresponding to the scenario. If a matched same ambient sound signal is found, the processor determines to process the ambient sound signal to generate a prompt signal; or if no matched same ambient sound signal is found, the processor determines to perform noise reduction processing on the ambient sound signal.

It should be understood that the foregoing illustrated specific method for determining, by the processor, a processing policy based on the user status information and the ambient sound signal is merely an example for description, and shall not be construed as any limitation on the present invention. Any other methods in which the processing policy may be determined based on the user status information and the ambient sound signal shall fall within the protection scope of the present invention.

It may be understood that the microphone may collect one or more ambient sound signals in any time period. The processor may directly analyze the received ambient sound signal to determine the processing policy, or may filter the received ambient sound signal for a first time, and after an ambient sound signal that does not need to be used to prompt the user in all user status information is filtered out, a non-filtered ambient sound signal (the ambient sound signal that is not filtered out in the first filtering is recorded as a valid sound signal for ease of differentiation and understanding) is filtered for a second time with reference to the current user status information, to finally determine whether to process the ambient sound signal to generate a prompt signal.

Therefore, in this embodiment of the present invention, the received ambient sound signal is processed based on the current user status information. An ambient sound signal for which the user needs to be prompted is processed to generate a prompt signal to prompt the user, and noise reduction processing is performed on an ambient sound signal for which the user does not need to be prompted. In this way, unnecessary disturbance is prevented from the user, and user experience is accordingly improved.

Further, when the processor determines to process the ambient sound signal A to generate a prompt signal, the ambient sound signal A may be directly played by using the headset (or the speaker), so as to be output to the user.

However, this cannot achieve optimal user experience. For example, when the user is on a very important conference call, if the user receives a telephone ringtone from the outside, the current conference call of the user is affected; or when the user is answering an important call, if the user receives a bus-stop announcement sound from the outside, call quality of the user is affected; or when the user is at an important stage of a game, for example, jumping to avoid falling off a cliff, if the user receives a washing machine prompt sound in this case, the user may be interfered and misses a best occasion for the jumping. Therefore, in this embodiment of the present invention, an output manner of the prompt signal is further determined with reference to priority information of a currently running service and/or priority information of the ambient sound signal.

Optionally, the generating, by the processor, a prompt signal based on the ambient sound signal includes:

S232. The processor determines an output manner of the prompt signal based on priority information of a service currently running on the terminal and/or priority information of the ambient sound signal.

S234. The processor generates the prompt signal based on the output manner of the prompt signal and the ambient sound signal.

Specifically, the processor may determine the output manner of the prompt signal based on the priority information of the service currently running on the terminal, or may determine the output manner of the prompt signal based on the priority information of the ambient sound signal, or may determine the output manner of the prompt signal based on a relationship between priority information of the service and a priority of the ambient sound signal. For example, when the user is on an important conference call, if the user receives a telephone ringtone from the outside, the telephone ringtone may be played while a playing sound of the current conference call is turned down, or the user is prompted with call access by using a text message after the conference call ends. In this case, a priority of the conference call is higher than a priority of the telephone ringtone. In other words, the priority of the service is higher than the priority of the ambient sound signal.

On the contrary, if a fire alarm from the outside is received, the fire alarm needs to be immediately played and the playing sound of the current conference call may be interrupted, to play the fire alarm in a manner that can best draw attention of the user. In this case, the fire alarm has a highest priority. In other words, the ambient sound signal has a highest priority.

For another example, when the user is at an important stage of a game, if the user receives a washing machine prompt sound, the user may not be reminded in a form of a sound signal, but is prompted in a form of a text message after the game ends. In this case, a priority of the game is higher than a priority of the washing machine prompt sound. In other words, the priority of the service is higher than the priority of the ambient sound signal.

On the contrary, if a telephone ringtone is received in this case, the current game may be interrupted, and the telephone ringtone is immediately played to prompt the user. That is, a priority of the game is lower than a priority of the telephone ringtone. In other words, the priority of the service is lower than the priority of the ambient sound signal.

For another example, if the user receives a ringtone of an office telephone when working in an office and wearing a headset with a noise reduction function enabled, the noise reduction function may be paused, and the telephone ringtone is played to prompt the user. In this case, a priority of the noise reduction function is lower than a priority of the telephone ringtone. In other words, the priority of the service is lower than the priority of the ambient sound signal.

For another example, when the user suddenly receives a doorbell ringtone when watching a video at home with a headset, in this case, video playing may be directly paused, and the doorbell ringtone is played to prompt the user. In this case, the video playing has a lowest priority. In other words, the service has the lowest priority.

For another example, if the user suddenly receives a telephone ringtone when listening to relatively soothing music during a noon break, and the telephone ringtone is a heavy metal song, a sudden switch to the heavy metal song of the telephone ringtone depresses the user very much. In this case, sound synthesis processing may be performed on the telephone ringtone, so that the telephone ringtone is played at a relatively soothing tune to prompt the user. In this case, it may be considered that a priority of music playing is the same as a priority of the telephone ringtone.

It may be learned from the foregoing examples that the output manner of the prompt signal may be determined with reference to the priority of the service currently running on the terminal and/or the priority of the ambient sound signal, to improve user experience.

In a possible implementation, the processor may pre-store the priority information of the service and/or the priority information of the ambient sound signal, or obtain the priority information of the service and/or the priority information of the ambient sound signal from the server.

It should be noted that the relationship between priority information of a plurality of services and priority information of a plurality of ambient sound signals may be manually defined and preset in the terminal or the server. For example, the services may be classified into five priorities based on service types through setting, and the ambient sound signals may also be classified into five priorities through setting. When it is considered that a service A and the ambient sound signal A have a same priority, a same priority may be set for the service A and the ambient sound signal A, for example, the priority is 1; and when it is considered that a priority of a service B is higher than the priority of the service A, the priority of the service B may be set to 2.

It should be understood that specific settings that are of the priority of the service and the priority of the ambient sound signal and that are illustrated herein are merely examples for description, and shall not be construed as any limitation to the present invention.

Optionally, the priority information of the ambient sound signal may be stored in a valid ambient sound set, to form a mapping relationship with each sound feature information. In other words, each sound feature information corresponds to one piece of priority information.

Optionally, the priority information of the service may be determined based on a service type and a service parameter of the service.

For example, when the service currently running on the terminal is a call answering service, the service parameter of the service may be further determined. For example, a call object may be determined by using an address book stored in the terminal, or whether a call is an advertising call or a nuisance call may be determined based on whether the phone number is stored in an address book. When it is determined, by using the address book, that the call object is a leader or a relative, it may be considered that a priority of the service is relatively high in this case; or when it is determined that the call object is not in the address book, it may be considered that a priority of the service is relatively low in this case.

The processor may determine the output manner of the ambient sound signal A by performing step S232, and then may generate a corresponding prompt signal based on the output manner.

It should be understood that sequence numbers of the foregoing processes do not mean execution sequences. The execution sequences of the processes should be determined based on functions and internal logic of the processes, and shall not be construed as any limitation on the implementation processes of this embodiment of the present invention.

For example, S232 may be performed before S222 and S224 or before S226 and S228. In other words, the output manner is first determined based on the priority information of the ambient sound signal, and then when it is determined to process the ambient sound signal to generate a prompt signal, the corresponding prompt signal is directly generated based on the pre-determined output manner.

Optionally, the pre-stored set of valid sound signals may pre-store a mapping relationship between a valid sound signal and an output manner, and when the valid sound signal is received, a prompt signal may be directly generated based on a corresponding output manner.

In this manner, when the valid sound signal is collected, the valid sound signal may be immediately processed to generate a prompt signal. Compared with the method described above (in which the output manner is further determined when it is determined that the valid sound signal needs to be processed to generate a prompt signal), this manner reduces a prompt delay that is caused because S232 of determining an output manner is performed before step S234 of outputting the prompt signal.

Optionally, the pre-stored set of valid sound signals may not store a mapping relationship between a valid sound signal and an output manner, but the output manner is further determined after it is determined that processing needs to be performed to generate a prompt signal.

In this manner, the priority of the service may be dynamically determined based on the service type and the service parameter, and the output manner is further determined based on the priority of the service and/or the priority of the ambient sound signal. Therefore, this manner is more flexible. In this embodiment of the present invention, as an example instead of a limitation, the output manner includes a sound output manner or a text output manner. Correspondingly, the prompt signal may be a sound prompt signal or a text prompt message.

Optionally, the generating, by the processor, the prompt signal based on the output manner of the prompt signal and the ambient sound signal in S234 includes:

generating, by the processor, the sound prompt signal based on the ambient sound signal when the processor determines that the output manner of the prompt signal is the sound output manner; or generating, by the processor, the text prompt message based on the ambient sound signal when the processor determines that the output manner of the prompt signal is the text output manner.

Optionally, the generating, by the processor, the sound prompt signal based on the ambient sound signal includes:

determining, by the processor, a signal-to-noise ratio of the ambient sound signal; and when the signal-to-noise ratio of the ambient sound signal is greater than or equal to a preset threshold, performing, by the processor, noise reduction processing and/or synthesis processing on the ambient sound signal to generate the sound prompt signal; or when the signal-to-noise ratio of the ambient sound signal is less than the preset threshold, using the ambient sound signal as the sound prompt signal.

Specifically, the processor may analyze the received ambient sound signal A to determine the signal-to-noise ratio. To be specific, the collected ambient sound signal includes two parts: a prompt sound and an ambient noise, and the processor may separately extract the prompt sound and the ambient noise to calculate a ratio of the prompt sound to the ambient noise.

When it is determined that the signal-to-noise ratio is greater than or equal to the preset threshold, it may be considered that the ambient sound signal has poor quality, and noise reduction processing and/or sound synthesis processing need/needs to be performed on the ambient sound signal. The noise reduction processing means extracting a valid sound signal (namely, the prompt sound) from the ambient sound signal and processing a remaining sound signal (namely, the noise), so that a prompt signal obtained after the processing has a higher signal-to-noise ratio and a higher definition and can be easily recognized by the user (for ease of description, briefly referred to as having higher sound quality). The sound synthesis processing means extracting the prompt sound and synthesizing the prompt sound with a pre-stored sound to generate a prompt signal, so that the output prompt signal has better quality.

Optionally, the processor may first perform noise reduction processing on the ambient sound signal and then synthesize the ambient sound signal with a pre-stored sound to generate a prompt signal, to improve quality of the output prompt signal.

It should be understood that both the noise reduction processing and the sound synthesis processing may be implemented by using the prior art. Herein, for brevity, a detailed description of a specific process in the prior art is omitted. It should be further understood that the noise reduction processing and the sound synthesis processing are merely two possible implementations of processing the ambient sound signal to generate the prompt signal, and shall not be construed as any limitation on the present invention. The processor may also process the ambient sound signal in another manner, to improve quality of an output sound signal.

Optionally, the generating, by the processor, the text prompt message based on the ambient sound signal includes:

determining, by the processor, whether the ambient sound signal is a speech signal or a non-speech signal;

when the ambient sound signal is the speech signal, obtaining, by the processor, prompt information carried in the speech signal; and generating, by the processor, the text prompt message, where the text prompt message carries the prompt information; or when the ambient sound signal is the non-speech signal, determining, by the processor based on a sound feature of the ambient sound signal and a pre-stored one-to-one correspondence between a plurality of pieces of sound feature information and a plurality of associated prompt statements, an associated prompt statement corresponding to the sound feature of the ambient sound signal; and generating, by the processor, the text prompt message, where the text prompt message includes the associated prompt statement.

Specifically, when the ambient sound signal is the speech signal, the processor may obtain, by using an existing speech recognition technology, the information carried in the speech signal, and convert the information into the text prompt message; or when the ambient sound signal is the non-speech signal, the processor may pre-store the one-to-one correspondence between the plurality of pieces of sound feature information and the plurality of associated prompt statements, and when receiving the non-speech signal, the processor matches sound feature information of the received non-speech signal against the pre-stored plurality of pieces of sound feature information, and extracts a matched associated prompt statement corresponding to the non-speech signal, to generate the text prompt message.

For example, sound feature information (for example, a frequency) of a washing machine prompt sound may be associated with a text prompt message of a prompt statement "The washing machine sends a prompt." When obtaining an ambient sound signal that has the same sound feature information, the processor may convert the ambient sound signal into the associated text prompt message.

It should be understood that recognition of a speech signal by using the speech recognition technology may be implemented by using the prior art. Herein, for brevity, a detailed description of a specific process in the prior art is omitted.

Optionally, the sound output manner may include a first output manner. The first output manner is specifically interrupting a current operating mode of the headset and playing the sound prompt signal. The current operating mode of the headset corresponds to the service currently running on the terminal.

Optionally, the determining, by the processor, an output manner of the prompt signal based on priority information of a service currently running on the terminal and/or priority information of the ambient sound signal includes:

when determining that the ambient sound signal has a highest priority, or when determining that the service currently running on the terminal has a lowest priority, or when determining that a priority of the ambient sound signal is higher than or equal to a priority of the service currently running on the terminal, determining, by the processor, that the output manner of the prompt signal is the first output manner.

Specifically, the current operating mode of the headset may correspond to the service currently running on the terminal. For example, when the terminal is currently running a sound signal output service such as audio or a video, the headset is in an operating mode of playing a sound signal; or when the terminal is currently running a call answering service, the headset is also in a sound signal playing mode; or when the terminal is currently running a noise reduction function, the headset is in a noise reduction mode.

The first output manner is interrupting a sound signal currently played by the headset, or pausing the noise reduction mode, to play the sound prompt signal.

Further, the sound output manner may include a second output manner. The second output manner is specifically decreasing volume of a currently played sound signal and playing the sound prompt signal at the same time.

Optionally, the determining, by the processor, an output manner of the prompt signal based on priority information of a service currently running on the terminal and priority information of the ambient sound signal includes:

when determining that a priority of the ambient sound signal is equal to a priority of the service currently running on the terminal, determining, by the processor, that the output manner of the prompt signal is the second output manner.

Further, the processor may detect, in advance, whether a display screen is configured in the terminal. When determining that a display screen is configured in the terminal, the processor may output the prompt signal in a text output manner; or when determining that a television screen is not configured in the terminal, the processor may output the prompt signal in a sound output manner (for example, a third output manner described below).

Optionally, the determining, by the processor, an output manner of the prompt signal based on priority information of a service currently running on the terminal and priority information of the ambient sound signal includes:

when determining that a priority of the ambient sound signal is lower than a priority of the service currently running on the terminal, determining, by the processor, that the output manner of the prompt signal is the text output manner.

Optionally, the sound output manner may include a third output manner. The third output manner is specifically playing the sound prompt signal after a sound signal currently played by the headset ends.

Optionally, the determining, by the processor, an output manner of the prompt signal based on priority information of a service currently running on the terminal and priority information of the ambient sound signal includes:

when determining that a priority of the ambient sound signal is lower than a priority of the service currently running on the terminal, determining, by the processor, that the output manner of the prompt signal is the third output manner.

It should be understood that the foregoing illustrated specific method for determining the output manner of the prompt signal based on the priority of the service and the priority of the ambient sound signal is merely an example for description, and shall not be construed as any limitation on the present invention. The present invention shall not be limited thereto either.

Optionally, after the generating the prompt signal based on the ambient sound signal in S234, the method 200 further includes:

S236. Output the prompt signal.

Optionally, the outputting the prompt signal in S236 includes:

playing the sound prompt message by using the headset or the speaker.

Specifically, in the case 1 in which the headset jack or the Bluetooth module may be configured in the terminal, the processor (namely, the first processor) configured in the terminal may send the sound prompt signal to the headset by using the headset cable or the radio frequency technology, and play the sound prompt signal by using the headset; and in the case 2 in which the speaker may be configured in the headset, the speaker may obtain the sound prompt signal from the processor (namely, the second processor) of the headset and play the sound prompt signal.

Optionally, the outputting the prompt signal in S236 includes:

presenting the text prompt message by using the display screen.

Specifically, in the case 1 in which the display screen may be configured in the terminal, the display screen may obtain the text prompt message from the first processor, and present the text prompt message; and in the case 2 in which the display screen may be configured in the terminal, and the headset cable or the Bluetooth module may be configured in the headset, the second processor may send the text prompt message to the terminal by using the headset cable or the Bluetooth module, and present the text prompt message by using the display screen.

The foregoing describes, in detail, specific processes of determining, by the processor, the output manner of the prompt signal based on the priority of the service and/or the priority of the ambient sound signal and generating the prompt signal. The following describes, in detail, a process of performing noise reduction processing on the ambient sound signal.

According to the method described in step S220 (specifically, S222 and S224, or S226 and S228), the processor may determine whether to perform noise reduction processing on the ambient sound signal A.

The performing noise reduction processing on the ambient sound signal A described herein means using the received ambient sound signal A as a noise, and processing the ambient sound signal A to prevent the ambient sound signal A from being perceived by the user; or processing the ambient sound signal A when the processor obtains the ambient sound signal A, to prevent the ambient sound signal A from being output by the processor or played by the headset (or the speaker).

It should be noted that the headset in this embodiment of the present invention may be a headset with an active noise reduction function. When the ambient sound signal A is detected, if it is determined, by using the method described above, to perform noise reduction processing on the ambient sound signal A, the noise reduction function of the headset may continue to be performed. On the contrary, if it is determined, by using the method described above, to process the ambient sound signal A to generate the prompt signal, the noise reduction function of the headset may be paused, to collect the ambient sound signal A, and process the ambient sound signal A to generate the prompt signal.

Alternatively, the headset in this embodiment of the present invention may be a headset with a passive noise reduction function, and the headset performs noise reduction by using a physical method. When the ambient sound signal A is detected, if it is determined, by using the method described above, to perform noise reduction processing on the ambient sound signal A, no processing may be performed. On the contrary, if it is determined, by using the method described above, to process the ambient sound signal A to generate the prompt signal, the collected ambient sound signal A may be processed to generate the prompt signal.

Alternatively, the headset in this embodiment of the present invention may be a common headset. When the ambient sound signal A is detected, if it is determined, by using the method described above, to perform noise reduction processing on the ambient sound signal A, the processor of the terminal may perform noise reduction processing on the ambient sound signal A. On the contrary, if it is determined, by using the method described above, to process the ambient sound signal A to generate the prompt signal, the collected ambient sound signal A may be processed to generate the prompt signal.

Therefore, according to the sound signal processing method in this embodiment of the present invention, the processing policy is determined with reference to the user status information. This can prevent unnecessary disturbance from the user. Further, the output manner of the ambient sound signal is determined based on the priority information of the service and/or the priority information of the ambient sound signal. This can further improve user experience.

The foregoing describes, in detail, the sound signal processing method in the embodiment of the present invention with reference to FIG. 2. The following describes, in detail, a sound signal processing apparatus according to an embodiment of the present invention with reference to FIG. 3 to FIG. 5.

Figure 3:
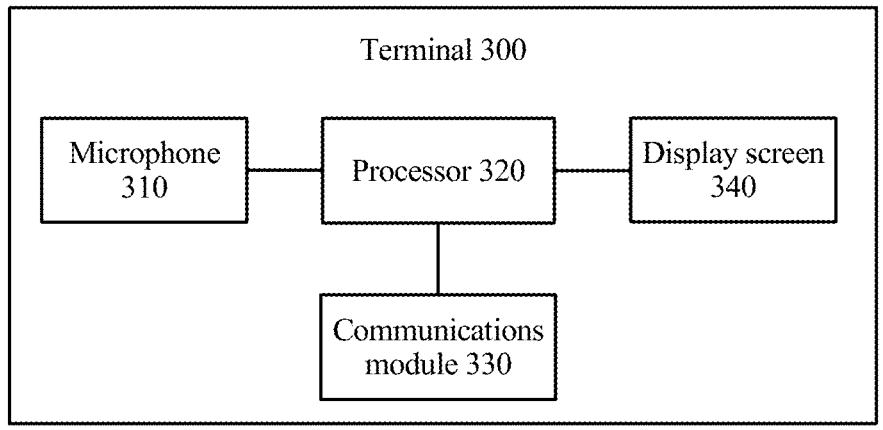
FIG. 3 is a schematic block diagram of a terminal according to an embodiment of the present invention.

FIG. 3 is a schematic block diagram of a terminal 300 according to an embodiment of the present invention. As shown in FIG. 3, the terminal 300 includes: a microphone 310 and a processor 320.

The microphone 310 is configured to collect an ambient sound signal.

The processor 320 is configured to obtain the ambient sound signal collected by the microphone 310, and process the ambient sound signal based on user status information. The user status information includes a geographical location of a user who uses the terminal 300 or a motion status of the user.

Optionally, when processing the ambient sound signal based on the user status information, the processor 320 is configured to determine, based on the user status information, a set of valid sound signals that are used to prompt the user; and the processor 320 is configured to generate a prompt signal based on the ambient sound signal when determining that the ambient sound signal belongs to the set of valid sound signals; or the processor 320 is configured to perform noise reduction processing on the ambient sound signal when determining that the ambient sound signal does not belong to the set of valid sound signals.

Optionally, when processing the ambient sound signal based on the user status information, the processor 320 is configured to determine, based on the ambient sound signal, a set of target user status information that is met before the ambient sound signal is processed to generate a prompt signal; and the processor 320 is configured to generate the prompt signal based on the ambient sound signal when determining that the user status information belongs to the set of target user status information; or the processor 320 is configured to perform noise reduction processing on the ambient sound signal when determining that the ambient sound signal does not belong to the set of target user status information.

Optionally, the processor 320 is further configured to determine an output manner of the prompt signal based on priority information of a service currently running on the terminal 300 and/or priority information of the ambient sound signal; and the processor 320 is further configured to generate the prompt signal based on the output manner of the prompt signal and the ambient sound signal.

Optionally, the output manner includes a sound output manner, and the prompt signal includes a sound prompt signal;

when generating the prompt signal based on the output manner of the prompt signal and the ambient sound signal, the processor 320 is specifically configured to generate the sound prompt signal based on the ambient sound signal when determining that the output manner of the prompt signal is the sound output manner; and the terminal 300 further includes a communications module 330, configured to send the sound prompt signal to a headset, so that the sound prompt signal generated by the processor is played by using the headset. Specifically, the sound prompt signal may be played by using a speaker of the headset.

Optionally, the communications module 330 includes a headset jack and/or a Bluetooth module.

Optionally, the sound output manner includes a first output manner, the first output manner is interrupting a current operating mode of the headset and playing the sound prompt signal, and the current operating mode of the headset corresponds to the service currently running on the terminal 300; and when determining the output manner of the prompt signal based on the service information of the service currently running on the terminal 300, the processor 320 is specifically configured to:

when determining that the ambient sound signal has a highest priority, or when determining that the service currently running on the terminal has a lowest priority, or when determining that a priority of the ambient sound signal is higher than or equal to a priority of the service, determine that the output manner of the prompt signal is the first output manner.

Optionally, the output manner includes a text output manner, and the prompt signal includes a text prompt message;

when generating the prompt signal based on the output manner of the prompt signal and the ambient sound signal, the processor 320 is specifically configured to generate the text prompt message based on the ambient sound signal when determining that the output manner of the prompt signal is the text output manner; and the terminal further includes a display screen 340, configured to present the text prompt message.

The processor 320 according to this embodiment of the present invention may correspond to the sound signal processing apparatus in the sound signal processing method 200 according to the embodiment of the present invention, and the processor 320 may be configured in the terminal 300, to implement corresponding procedures in the method in FIG. 2 by performing the foregoing other operations and/or functions. For brevity, details are not described herein.

Therefore, the terminal in this embodiment of the present invention processes, with reference to the user status information, an ambient sound signal for which the user needs to be prompted, to generate a prompt signal to prompt the user, and performs noise reduction processing on an ambient sound signal for which the user does not need to be prompted. This can prevent unnecessary disturbance from the user. Further, the output manner of the ambient sound signal is determined based on the priority information of the service and/or the priority information of the ambient sound signal. This can further improve user experience.

For ease of understanding, the following describes, in detail, the terminal according to this embodiment of the present invention by using a mobile phone as an example.

Figure 4:
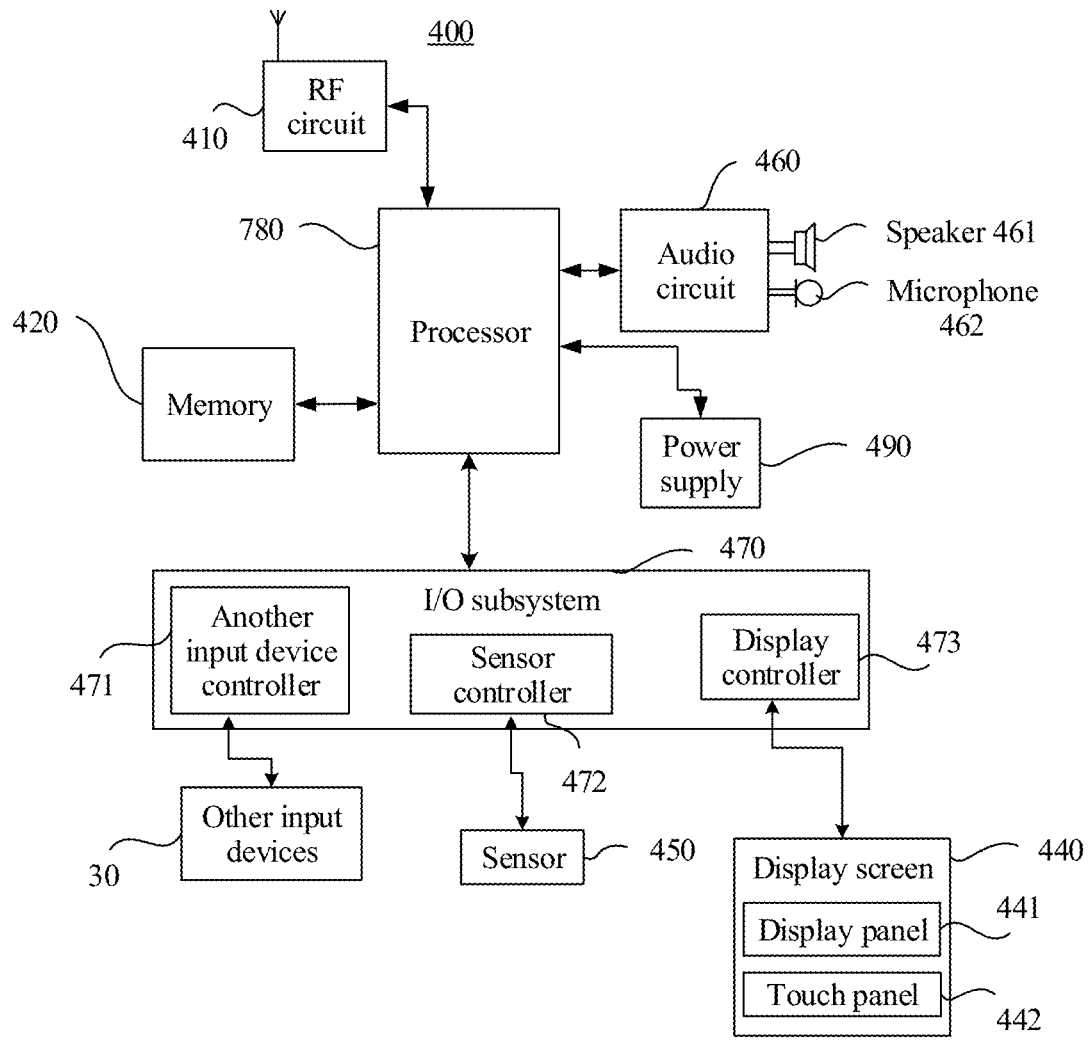
FIG. 4 is a schematic block diagram of a mobile phone according to another embodiment of the present invention.

FIG. 4 is a schematic block diagram of a mobile phone 400 according to another embodiment of the present invention. Specifically, FIG. 4 is a block diagram of a partial structure of the mobile phone related to this embodiment of the present invention. As shown in FIG. 4, the mobile phone 400 includes components such as a radio frequency (Radio Frequency, "RF" for short) circuit 410, a memory 420, other input devices 430, a display screen 440, a sensor 450, an audio circuit 460, an I/O subsystem 470, a processor 480, and a power supply 490. A person skilled in the art may understand that the structure of the mobile phone shown in FIG. 4 does not constitute any limitation on the mobile phone, and the mobile phone may include more or fewer components than those shown in the figure, or combine some components, or have different component arrangements. A person skilled in the art may understand that the display screen 410 is a user interface (User Interface, "UI" for short), and the mobile phone 400 may include more or fewer user interfaces than those shown in the figure.

The following describes the components of the mobile phone in detail with reference to FIG. 4.

The RF circuit 410 may be configured to receive and send information, or receive and send a signal during a call. In particular, after receiving downlink information of a base station, the RF circuit 410 sends the downlink information to the processor 480 for processing; and in addition, sends uplink data of the mobile phone to the base station. The RF circuit usually includes but is not limited to an antenna, at least one amplifier, a transceiver, a coupler, a low noise amplifier (Low Noise Amplifier, "LNA" for short), a duplexer, and the like. In addition, the RF circuit 410 may further communicate with a network and another device through wireless communication. The wireless communication may use any communications standard or protocol, including but not limited to a Global System for Mobile Communications (Global System for Mobile Communications, "GSM" for short), a general packet radio service (General Packet Radio Service, "GPRS" for short), Code Division Multiple Access (Code Division Multiple Access, "CDMA" for short), Wideband Code Division Multiple Access (Wideband Code Division Multiple Access, "WCDMA" for short), Long Term Evolution (Long Term Evolution, "LTE" for short), an email, and a short message service (Short Message Service, "SMS" for short).

Optionally, the RF circuit 410 may include a Bluetooth module that is connected to a Bluetooth headset and is configured to transmit a signal.

The memory 420 may be configured to store a software program and a module, and the processor 480 executes various functional applications and data processing of the mobile phone 400 by running the software program and the module that are stored in the memory 420. The memory 420 may mainly include a program storage area and a data storage area. The program storage area may store an operating system, an application program required by at least one function (such as a sound playing function or an image playing function), and the like. The data storage area may store data (such as audio data or a phonebook) created based on use of the mobile phone 400. In addition, the memory 420 may include a high-speed random access memory, or may include a non-volatile memory, for example, at least one magnetic disk storage device, a flash memory device, or another volatile solid-state storage device.

The other input devices 430 may be configured to receive entered digit or character information and generate key signal input related to a user setting and function control of the mobile phone 400. Specifically, the other input devices 130 may include but are not limited to one or more of a physical keyboard, a function key (such as a volume control key or an on/off key), a trackball, a mouse, a joystick, and an optical mouse (the optical mouse is a touch-sensitive surface that does not display a visual output, or an extension of a touch-sensitive surface formed by a touchscreen).

The other input devices 430 are connected to another input device controller 471 in the I/O subsystem 470, and exchange signals with the processor 480 under control of the another input device controller 471.

The display screen 440 may be configured to display information entered by a user or information provided for a user and various menus of the mobile phone 400, and may further receive user input. Specifically, the display screen 440 may include a display panel 441 and a touch panel 442. The display panel 441 may be configured in a form of an LCD (Liquid Crystal Display, liquid crystal display), an OLED (Organic Light-Emitting Diode, organic light-emitting diode), or the like. The touch panel 442, also referred to as a touchscreen, a touch-sensitive screen, or the like, may collect a touch or non-touch operation performed by a user on or near the touch panel 442 (for example, an operation performed by the user on the touch panel 442 or near the touch panel 442 by using any appropriate object or accessory such as a finger or a stylus; or a motion sensing operation, where the operation includes an operation type such as a single-point control operation or a multipoint control operation), and drive a corresponding connection apparatus based on a preset program. Optionally, the touch panel 442 may include two parts: a touch detection apparatus and a touch controller. The touch detection apparatus detects a touch position and gesture of the user, detects a signal brought by a touch operation, and sends the signal to the touch controller. The touch controller receives touch information from the touch detection apparatus, converts the touch information into information that can be processed by the processor, and sends the information to the processor 480. The touch controller can receive and execute a command sent from the processor 480. In addition, the touch panel 442 may be implemented by using a plurality of types such as a resistive type, a capacitive type, an infrared type, and a surface acoustic wave type, or the touch panel 442 may be implemented by using any technology developed in the future. Further, the touch panel 442 may cover the display panel 441. The user may perform, based on content displayed on the display panel 441 (the displayed content includes but is not limited to a soft keyboard, a virtual mouse, a virtual key, and an icon), an operation on or near the touch panel 442 that covers the display panel 441. After detecting the operation performed on or near the touch panel 442, the touch panel 442 transfers the operation to the processor 480 by using the I/O subsystem 470, to determine user input. Subsequently, the processor 480 provides corresponding visual output on the display panel 441 based on the user input by using the I/O subsystem 470. Although the touch panel 442 and the display panel 441 in FIG. 4 are used as two independent components to implement input and output functions of the mobile phone 400, in some embodiments, the touch panel 442 and the display panel 441 may be integrated to implement the input and output functions of the mobile phone 400.

The mobile phone 400 may further include at least one type of sensor 450, for example, a light sensor, a motion sensor, or another sensor. Specifically, the light sensor may include an ambient light sensor and a proximity sensor. The ambient light sensor may adjust luminance of the display panel 441 based on brightness of ambient light. The proximity sensor may turn off the display panel 441 and/or backlight when the mobile phone 400 moves close to an ear. As a type of motion sensor, an accelerometer sensor may detect a value of an acceleration in each direction (usually, three axes), may detect a value and a direction of gravity when the accelerometer sensor is motionless; and may be used in an application for identifying a mobile phone gesture (such as screen switching between a landscape mode and a portrait mode, a related game, or magnetometer posture calibration), a function related to vibration identification (such as a pedometer or a knock), and the like. Other sensors such as a gyroscope, a barometer, a hygrometer, a thermometer, and an infrared sensor may be further configured in the mobile phone 400. Details are not described herein.

The audio circuit 460, a speaker 461, and a microphone 462 may provide an audio interface between the user and the mobile phone 400. The audio circuit 460 may transmit, to the speaker 461, a received signal obtained after audio data conversion, and the speaker 461 converts the signal into a sound signal for output. Further, the microphone 462 converts a collected sound signal into a signal. The audio circuit 460 receives the signal, converts the signal into audio data, and outputs the audio data to the RF circuit 410, to send the audio data to, for example, another mobile phone, or outputs the audio data to the memory 420 for further processing. Optionally, the audio circuit 460 may include a headset jack, and the headset jack may be connected to a headset by using a headset cable, to transmit a signal.

The I/O subsystem 470 is configured to control an external input/output device, and may include the another input device controller 471, a sensor controller 472, and a display controller 473. Optionally, one or more other input device controllers 471 receive a signal from the other input devices 430 and/or send a signal to the other input devices 430. The other input devices 430 may include a physical button (such as a press button or a rocker button), a dial pad, a slider switch, a joystick, a click scroll wheel, and an optical mouse (the optical mouse is a touch-sensitive surface that does not display visual output, or an extension of a touch-sensitive surface formed by a touchscreen). It should be noted that the another input device controller 471 may be connected to any one or more of the foregoing devices. The display controller 473 in the I/O subsystem 470 receives a signal from the display screen 440 and/or sends a signal to the display screen 440. After the display screen 440 detects user input, the display controller 473 converts the detected user input into interaction with a user interface object displayed on the display screen 440, to implement man-machine interaction. The sensor controller 472 may receive a signal from one or more sensors 450 and/or send a signal to one or more sensors 450.

The processor 480 is a control center of the mobile phone 400, uses various interfaces and lines to connect all parts of the entire mobile phone, and performs various functions and data processing of the mobile phone 400 by running or executing the software program and/or the module stored in the memory 420 and invoking data stored in the memory 420, to perform overall monitoring on the mobile phone. Optionally, the processor 480 may include one or more processing units. Preferably, an application processor and a modem processor may be integrated into the processor 480. The application processor mainly processes an operating system, a user interface, an application program, and the like, and the modem processor mainly processes wireless communication. It may be understood that, alternatively, the modem processor may not be integrated into the processor 480.

The mobile phone 400 further includes the power supply 490 (such as a battery) that supplies power to the components. Preferably, the power supply may be logically connected to the processor 480 by using a power supply management system, to implement functions such as charging management, discharging management, and power consumption management by using the power supply management system.

Although not shown in the figure, the mobile phone 400 may further include a camera, a Bluetooth module, and the like. Details are not described herein.

It should be understood that the terminal 300 described above may be the mobile phone 400 shown in FIG. 4. When the terminal 300 is the mobile phone 400, the processor 320 in the terminal 300 may be the processor 480 in the mobile phone 400, the communications module 330 in the terminal 300 may include the Bluetooth module and/or the headset jack in the mobile phone 400, and the display screen 340 in the terminal 300 may be the touchscreen in the mobile phone 400.

Figure 5:
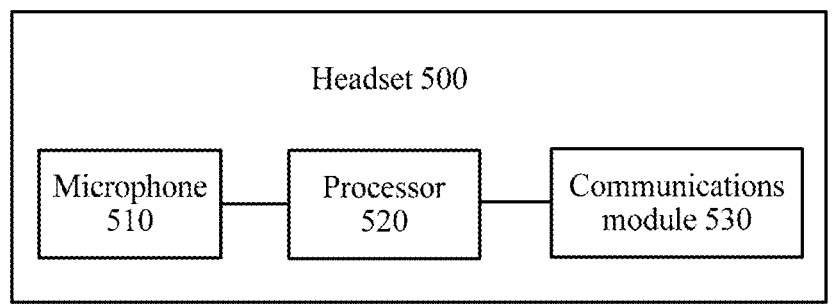
FIG. 5 is a schematic block diagram of a headset according to still another embodiment of the present invention.

FIG. 5 is a schematic block diagram of a headset 500 according to still another embodiment of the present invention. As shown in FIG. 5, the headset 500 includes: a microphone 510 and a processor 520.

The microphone 510 is configured to collect an ambient sound signal.

The processor 520 is configured to obtain the ambient sound signal collected by the microphone 510, and process the ambient sound signal based on user status information. The user status information includes a geographical location of a user who uses the terminal or a motion status of the user.

Optionally, when processing the ambient sound signal based on the user status information, the processor 520 is configured to determine, based on the user status information, a set of valid sound signals that are used to prompt the user; and the processor 520 is configured to generate a prompt signal based on the ambient sound signal when determining that the ambient sound signal belongs to the set of valid sound signals; or the processor 520 is configured to perform noise reduction processing on the ambient sound signal when determining that the ambient sound signal does not belong to the set of valid sound signals.

Optionally, when processing the ambient sound signal based on the user status information, the processor 520 is configured to determine, based on the ambient sound signal, a set of target user status information that is met before the ambient sound signal is processed to generate a prompt signal; and the processor 520 is configured to generate the prompt signal based on the ambient sound signal when determining that the user status information belongs to the set of target user status information; or the processor 520 is configured to perform noise reduction processing on the ambient sound signal when determining that the user status information does not belong to the set of target user status information.

Optionally, the processor 520 is further configured to determine an output manner of the prompt signal based on priority information of a service currently running on the terminal and/or priority information of the ambient sound signal; and the processor 520 is further configured to generate the prompt signal based on the output manner of the prompt signal and the ambient sound signal.

Optionally, the output manner includes a sound output manner, and the prompt signal includes a sound prompt signal;

when generating the prompt signal based on the output manner of the prompt signal and the ambient sound signal, the processor 520 is specifically configured to generate the sound prompt signal based on the ambient sound signal when determining that the output manner of the prompt signal is the sound output manner; and the headset 500 further includes: a speaker, configured to play the sound prompt signal generated by the processor 520.

Optionally, the sound output manner includes a first output manner, the first output manner is interrupting a current operating mode of the headset 500 and playing the sound prompt signal, and the current operating mode of the headset 500 corresponds to the service currently running on the terminal; and when determining the output manner of the prompt signal based on the priority information of the service currently running on the terminal and/or the priority information of the ambient sound signal, the processor is specifically configured to:

when determining that the ambient sound signal has a highest priority, or when determining that the service currently running on the terminal has a lowest priority, or when determining that a priority of the ambient sound signal is higher than or equal to a priority of the service, determining that the output manner of the prompt signal is the first output manner.

Optionally, the output manner includes a text output manner, and the prompt signal includes a text prompt message;

when generating the prompt signal based on the output manner of the prompt signal and the ambient sound signal, the processor 520 is specifically configured to generate the text prompt message based on the ambient sound signal when determining that the output manner of the prompt signal is the text output manner; and the headset 500 further includes a communications module 530, configured to send the text prompt message to the terminal connected to the headset 500, so that the text prompt message is presented by using a display screen configured on the terminal.

Optionally, the communications module 530 includes a headset cable and/or a Bluetooth module.

The processor 520 according to this embodiment of the present invention may correspond to the sound signal processing apparatus in the sound signal processing method 200 according to the embodiment of the present invention, and the processor 520 may be configured in the headset 500 and implement corresponding procedures in the method in FIG. 2 by performing the foregoing other operations and/or functions. For brevity, details are not described herein.

Therefore, according to the headset in this embodiment of the present invention, the ambient sound signal is processed with reference to the user status information. An ambient sound signal for which the user needs to be prompted is processed to generate a prompt signal to prompt the user, and noise reduction processing is performed on an ambient sound signal for which the user does not need to be prompted. This can prevent unnecessary disturbance from the user. Further, the output manner of the ambient sound signal is determined based on the priority information of the service and/or the priority information of the ambient sound signal. This can further improve user experience.

It should be understood that sequence numbers of the foregoing processes do not mean execution sequences. The execution sequences of the processes should be determined based on functions and internal logic of the processes, and shall not be construed as any limitation on the implementation processes of the embodiment of the present invention.

In an implementation process, each step of the foregoing method may be completed by using an integrated logical circuit of hardware in the processor or an instruction in a form of software. The steps of the method disclosed with reference to the embodiments of the present invention may be directly performed and completed by a hardware processor, or may be performed and completed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory, and the processor executes the instruction in the memory and completes the steps in the foregoing methods in combination with hardware of the processor. To avoid repetition, details are not described herein.

A person of ordinary skill in the art may be aware that, in combination with the examples described in the embodiments disclosed in this specification, method steps and units may be implemented by electronic hardware, computer software, or a combination thereof. To clearly describe interchangeability between the hardware and the software, the foregoing has generally described steps and compositions of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (Read-Only Memory, "ROM" for short), a random access memory (Random Access Memory, "RAM" for short), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A terminal, comprising:
   at least one processor; and
   a microphone, the microphone configured to collect an ambient sound signal;
   a memory coupled to the at least one processor and storing programming instructions that, when executed by the at least one processor, cause the terminal to:
      obtain the ambient sound signal collected by the microphone;
      determine, based on user status information, a set of valid sound signals that are used to prompt a user, wherein the user status information comprises a geographical location of the user who uses the terminal or a motion status of the user;
      generate a prompt signal based on the ambient sound signal in response to determining that the ambient sound signal belongs to the set of valid sound signals, wherein the prompt signal comprises a text prompt message;
      determine an output manner of the prompt signal based on priority information of a service currently running on the terminal and priority information of the ambient sound signal, wherein the output manner comprises a text output manner; and
      generate the text prompt message based on the ambient sound signal in response to determining that the output manner of the prompt signal is the text output manner.

2. The terminal according to claim 1, wherein the memory further stores instructions that, when executed by the at least one processor, cause the terminal to:
   perform noise reduction processing on the ambient sound signal in response to determining that the ambient sound signal does not belong to the set of valid sound signals.

3. The terminal according to claim 1, wherein the memory further stores instructions that, when executed by the at least one processor, cause the terminal to:
   determine, based on the ambient sound signal, a set of target user status information; and
   generate the prompt signal based on the ambient sound signal in response to determining that the user status information belongs to the set of target user status information.

4. The terminal according to claim 3, wherein the memory further stores instructions that, when executed by the at least one processor, cause the terminal to:

perform noise reduction processing on the ambient sound signal in response to determining that the user status information does not belong to the set of target user status information.

5. The terminal according to claim 1, wherein the terminal further comprises a display screen configured to present the text prompt message.

6. A headset, comprising:
at least one processor; and
a microphone, the microphone configured to collect an ambient sound signal;
a memory coupled to the at least one processor and storing programming instructions that, when executed by the at least one processor, cause the headset to:
  obtain the ambient sound signal collected by the microphone;
  determine, based on user status information, a set of valid sound signals that are used to prompt a user, wherein the user status information comprises a geographical location of the user who uses the headset or a motion status of the user;
  generate a prompt signal based on the ambient sound signal in response to determining that the ambient sound signal belongs to the set of valid sound signals, wherein the prompt signal comprises a text prompt message;
  determine an output manner of the prompt signal based on priority information of a service currently running on the headset and priority information of the ambient sound signal, wherein the output manner comprises a text output manner; and
  generate the text prompt message based on the ambient sound signal in response to determining that the output manner of the prompt signal is the text output manner.

7. The headset according to claim 6, wherein the memory further stores instructions that, when executed by the at least one processor, cause the headset to:
  perform noise reduction processing on the ambient sound signal in response to determining that the ambient sound signal does not belong to the set of valid sound signals.

8. The headset according to claim 6, wherein the memory further stores instructions that, when executed by the at least one processor, cause the headset to:
  determine, based on the ambient sound signal, a set of target user status information; and
  generate the prompt signal based on the ambient sound signal in response to determining that the user status information belongs to the set of target user status information.

9. The headset according to claim 8, wherein the memory further stores instructions that, when executed by the at least one processor, cause the headset to:
  perform noise reduction processing on the ambient sound signal in response to determining that the user status information does not belong to the set of target user status information.

10. The headset according to claim 6, wherein the headset further comprises a display screen configured to present the text prompt message.

11. A sound signal processing method, comprising:
  obtaining an ambient sound signal collected by a microphone;
  determining, based on user status information, a set of valid sound signals that are used to prompt a user using a terminal, wherein the user status information comprises a geographical location of the user who uses the terminal or a motion status of the user;
  generating a prompt signal based on the ambient sound signal in response to determining that the ambient sound signal belongs to the set of valid sound signals, wherein the prompt signal comprises a text prompt message;
  determining an output manner of the prompt signal based on priority information of a service currently running on the terminal and priority information of the ambient sound signal, wherein the output manner comprises a text output manner; and
  generating the text prompt message based on the ambient sound signal in response to determining that the output manner of the prompt signal is the text output manner.

12. The method according to claim 11, further comprising:
  performing noise reduction processing on the ambient sound signal in response to determining that the ambient sound signal does not belong to the set of valid sound signals.

13. The method according to claim 11, further comprising:
  determining, based on the ambient sound signal, a set of target user status information; and
  generating the prompt signal based on the ambient sound signal in response to determining that the user status information belongs to the set of target user status information.

* * * * *